United States Patent
Vincent et al.

[11] Patent Number: 6,152,681
[45] Date of Patent: Nov. 28, 2000

[54] CONTAINER SWEEP FOR A PALLETIZER AND METHOD

[75] Inventors: Patris E. Vincent, Madison; Brian E. Busse, Randolph, both of Wis.

[73] Assignee: Arrowhead Systems, LLC, Oshkosh, Wis.

[21] Appl. No.: 09/180,169

[22] PCT Filed: May 2, 1997

[86] PCT No.: PCT/US97/07387

§ 371 Date: Feb. 15, 1999

§ 102(e) Date: Feb. 15, 1999

[87] PCT Pub. No.: WO97/42113

PCT Pub. Date: Nov. 13, 1997

Related U.S. Application Data

[60] Provisional application No. 60/016,853, May 3, 1996, provisional application No. 60/017,014, May 3, 1996, and provisional application No. 60/016,845, May 3, 1996.

[51] Int. Cl.[7] .................................................. B65G 57/11
[52] U.S. Cl. ................................. 414/789.9; 414/794.6; 414/927; 414/799; 271/91
[58] Field of Search .............................. 414/799, 791.7, 414/927, 789.5, 789.9, 794.6; 271/91

[56] References Cited

U.S. PATENT DOCUMENTS

| | | | |
|---|---|---|---|
| 2,949,179 | 8/1960 | Busse | 414/789.5 |
| 3,219,203 | 11/1965 | Jeremiah | 214/6 |
| 3,493,126 | 2/1970 | Forshier et al. | 414/791.7 |
| 3,522,890 | 8/1970 | Birchall | 414/791.7 |
| 3,568,393 | 3/1971 | King et al. | 414/789.5 |
| 3,570,685 | 3/1971 | Carlson | 414/791.7 |
| 3,612,299 | 10/1971 | Shaw | 414/791.7 |
| 3,634,410 | 1/1972 | Powell | 414/791.7 |
| 3,659,726 | 5/1972 | Anderson | 414/791.7 |
| 3,662,902 | 5/1972 | Meissner | 414/799 |
| 3,682,290 | 8/1972 | Von Gal, Jr. et al. | 414/799 |
| 3,682,338 | 8/1972 | Von Gal, Jr. et al. | 414/799 |
| 3,897,877 | 8/1975 | Vandermeer et al. | 214/6 |
| 3,918,598 | 11/1975 | VanderMeer et al. | 414/799 |
| 3,990,566 | 11/1976 | Nordqvist | 414/791.7 |
| 4,759,673 | 7/1988 | Pearce et al. | 414/42 |
| 4,834,605 | 5/1989 | Jerred | 414/791 |
| 4,934,508 | 6/1990 | Vander Meer et al. | 414/791.7 |
| 4,978,275 | 12/1990 | Reid et al. | 414/789.5 |
| 5,074,744 | 12/1991 | Mastak | 414/799 |
| 5,080,551 | 1/1992 | Jerred | 414/791.7 |
| 5,195,627 | 3/1993 | Wyman | 414/791.6 |
| 5,271,709 | 12/1993 | VanderMeer et al. | 414/791.7 |
| 5,310,307 | 5/1994 | VanderMeer et al. | 414/796.8 |
| 5,437,533 | 8/1995 | VanderMeer et al. | 414/798.5 |
| 5,522,692 | 6/1996 | Simkowski | 414/791.7 |
| 5,733,100 | 3/1998 | Slat et al. | 414/791.7 |

Primary Examiner—Joseph A. Fischetti
Attorney, Agent, or Firm—Michael Best & Friedrich LLP

[57] ABSTRACT

A palletizer assembly including a sweep assembly including a frame having a pair of generally parallel side members and a pair of cross members extending between respective ends of the side members, the sweep assembly also including a pair of forward stanchions that extend vertically upward from respective side members, and a pair of rearward stanchions extending vertically upward from the upstream ends of the side members, a pair of generally vertically extending slides, each having a lower end connected to a side member and an upper end, plunger assemblies including a plunger support slidably supported by a respective slide between a lowered position and a raised position, each plunger assembly including a plurality of plungers which are fixed to, and extend downwardly from, the respective plunger support, and a container shift assembly supported by the frame and including a pair of shifter slide rails extending rearwardly of the rearward plunger support, the upstream ends of the shifter slide rails being offset from the downstream ends of the slider rails.

25 Claims, 18 Drawing Sheets

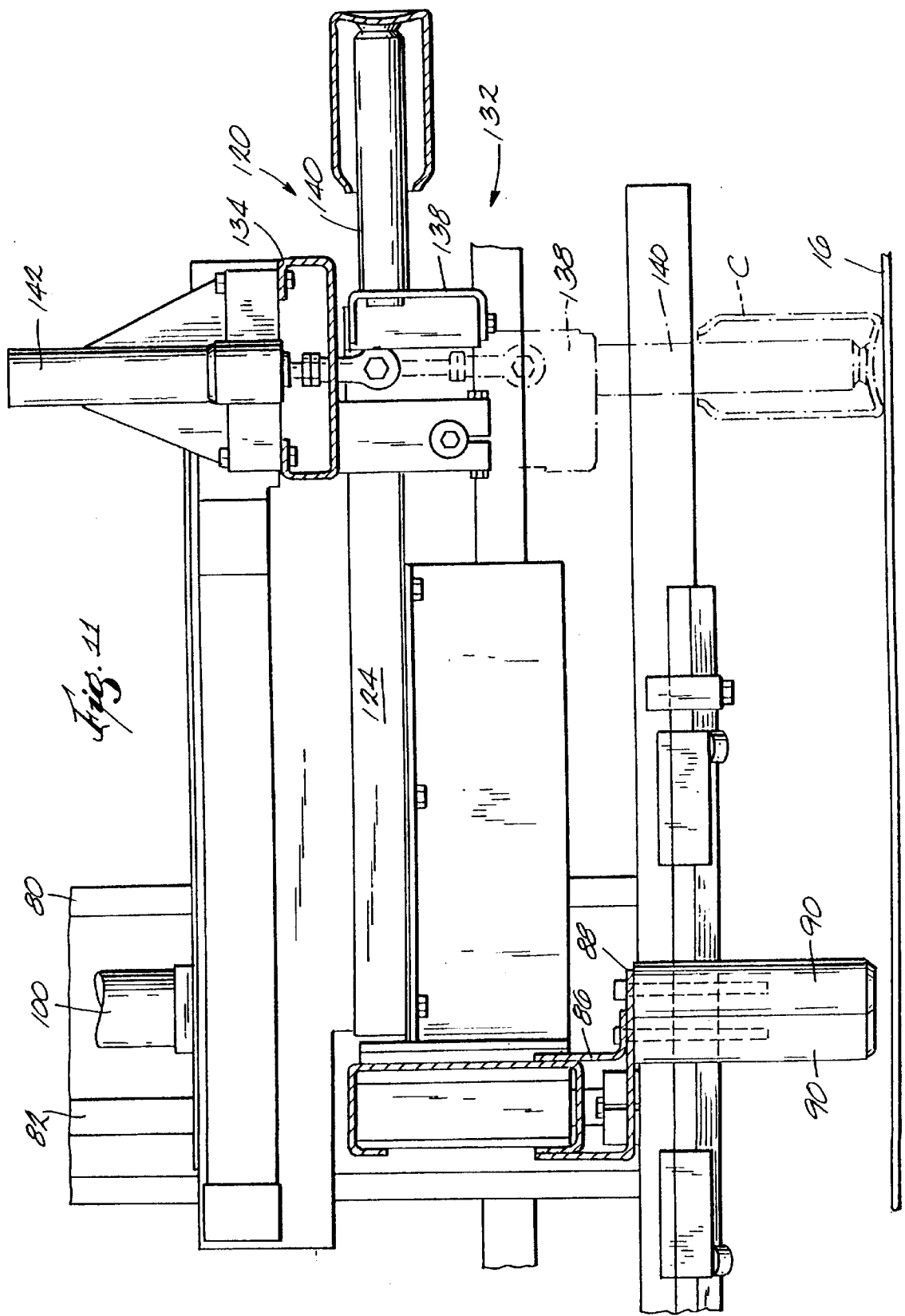

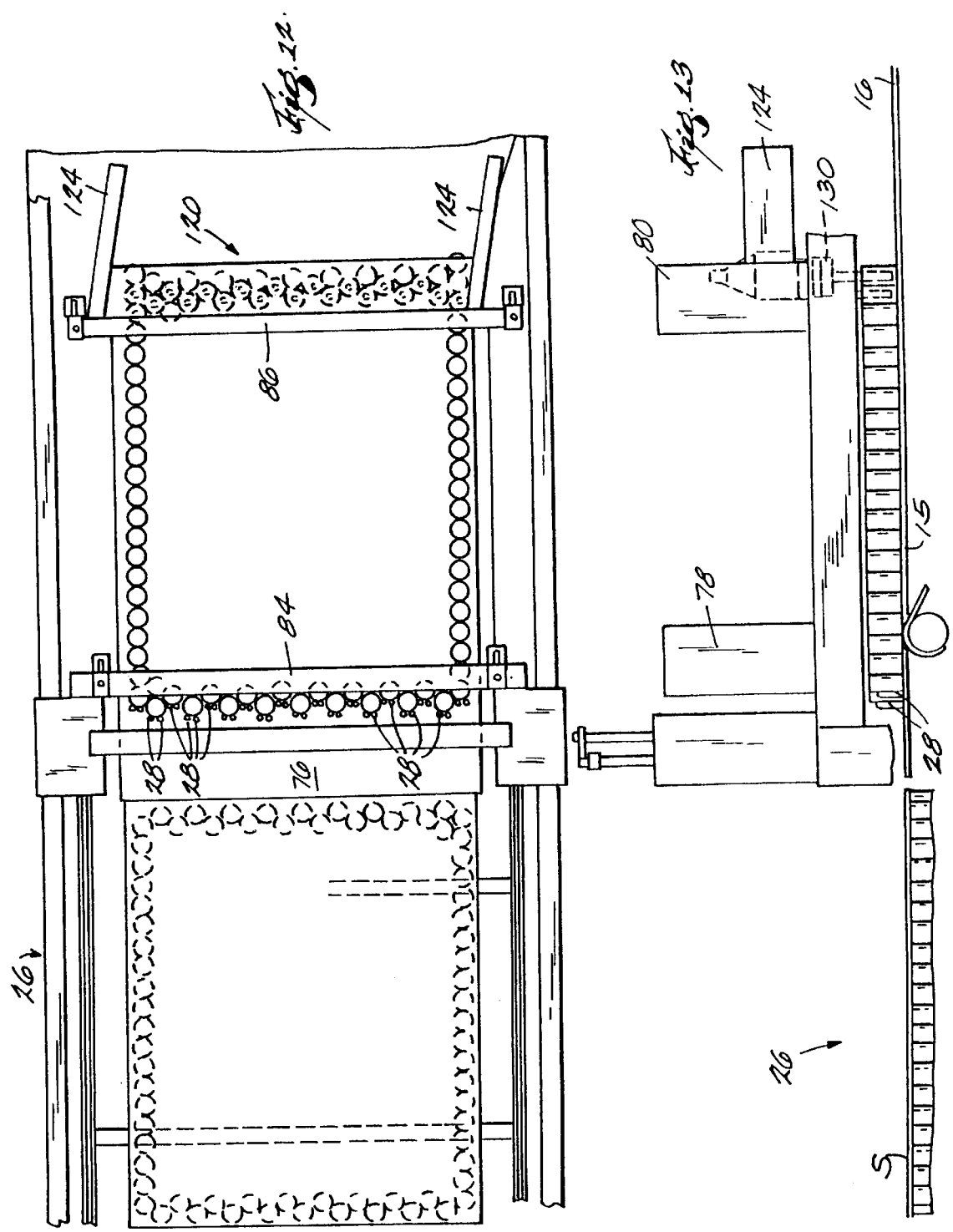

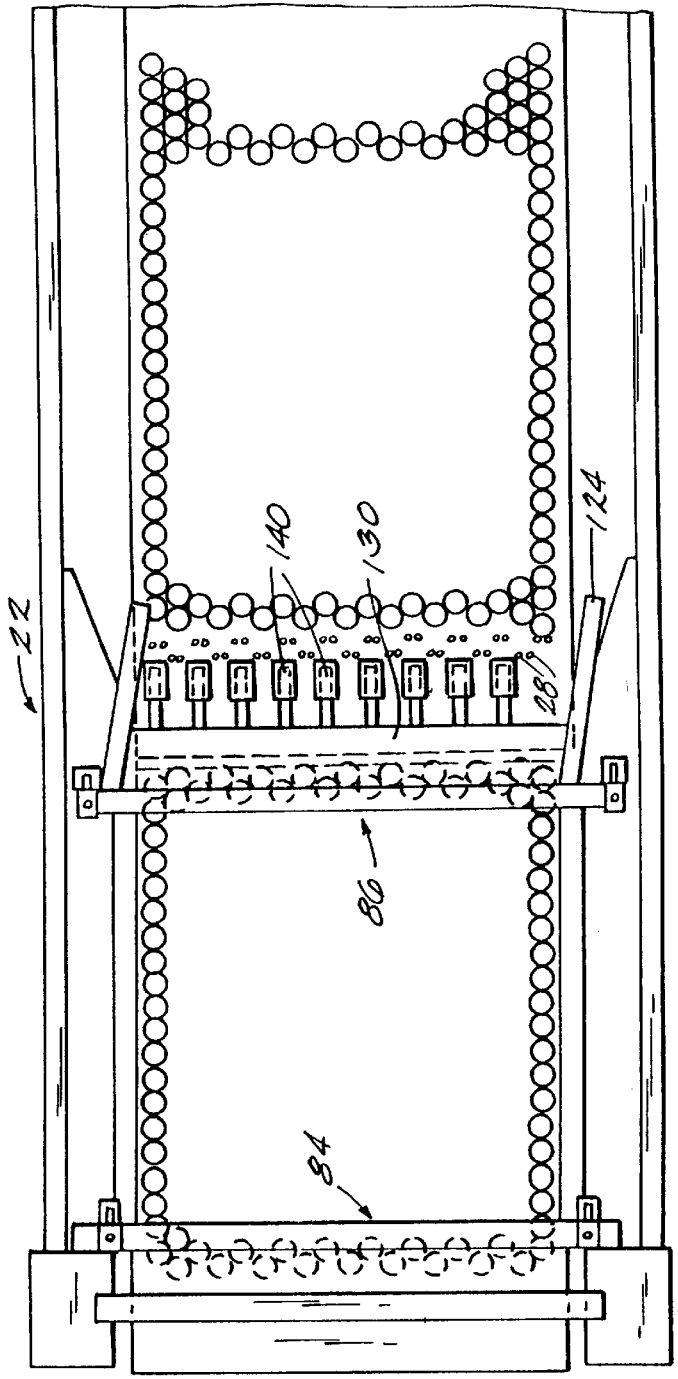
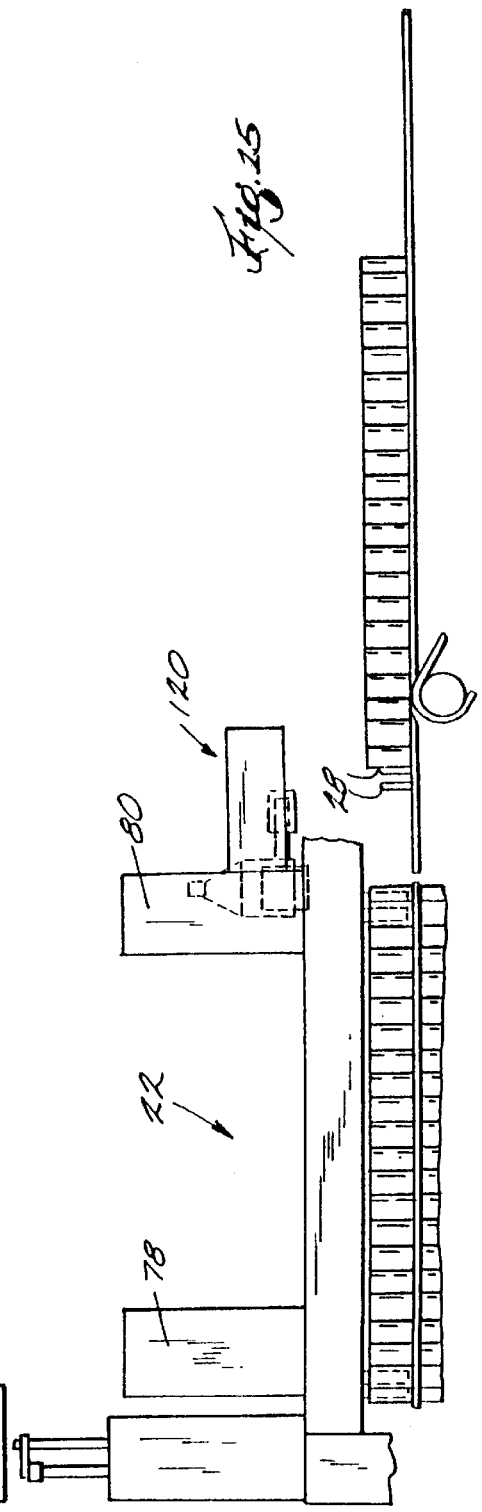

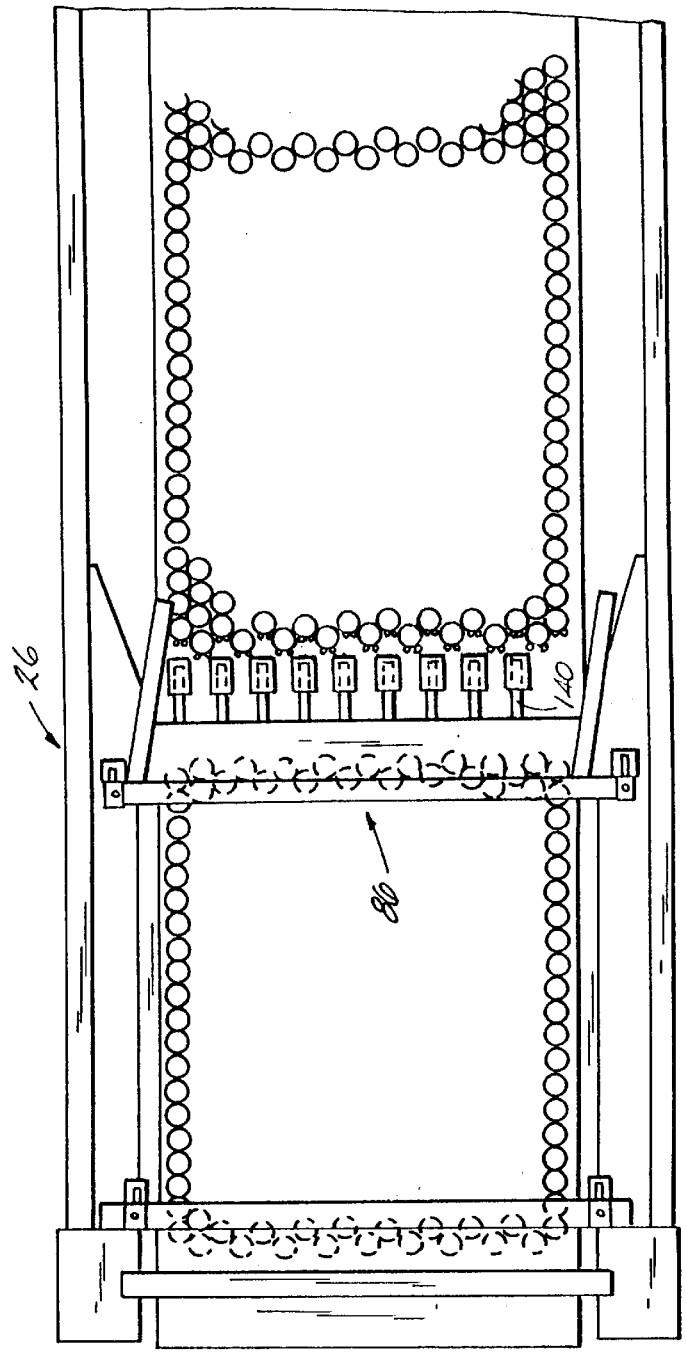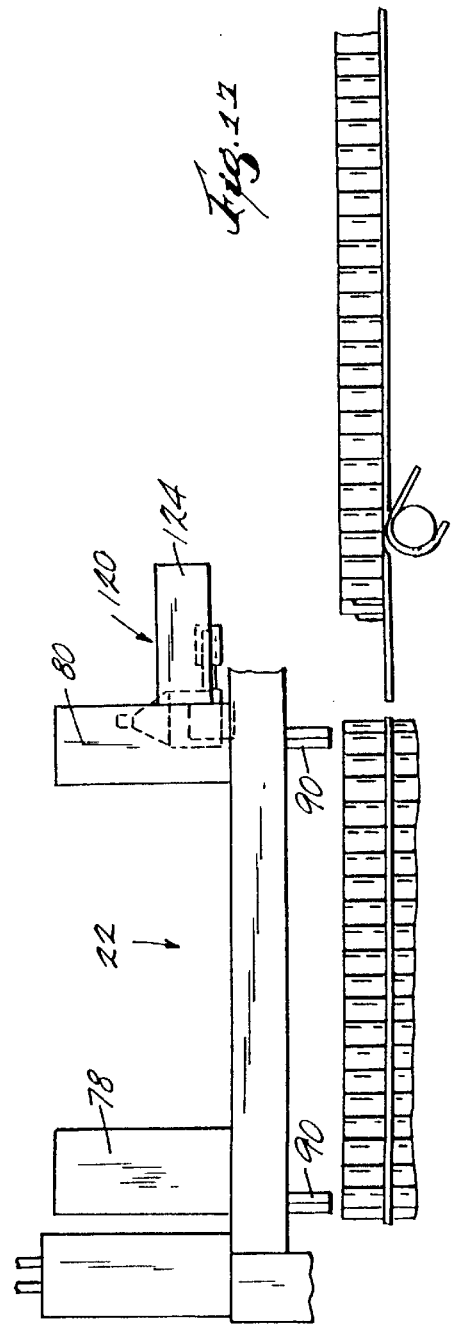

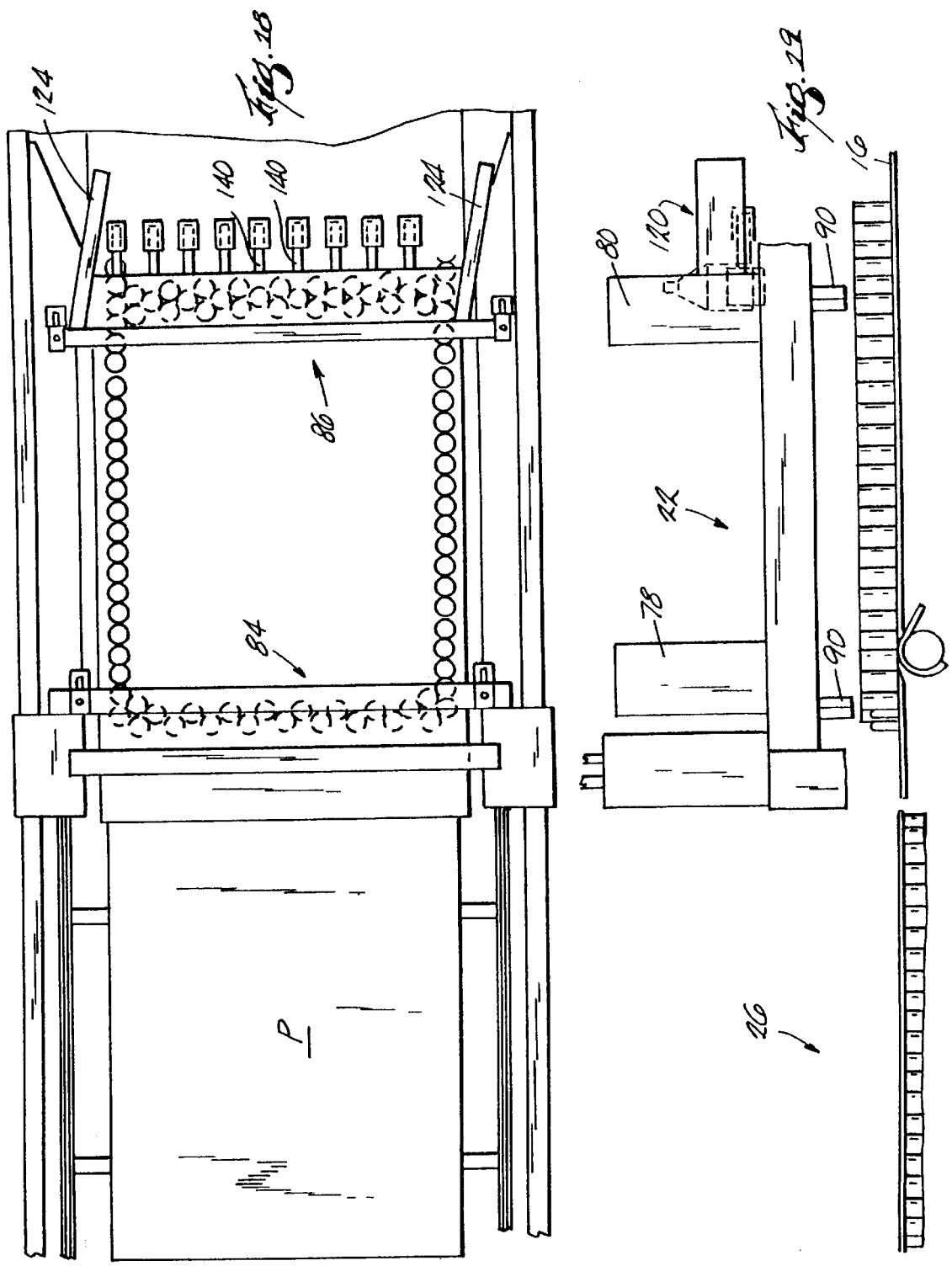

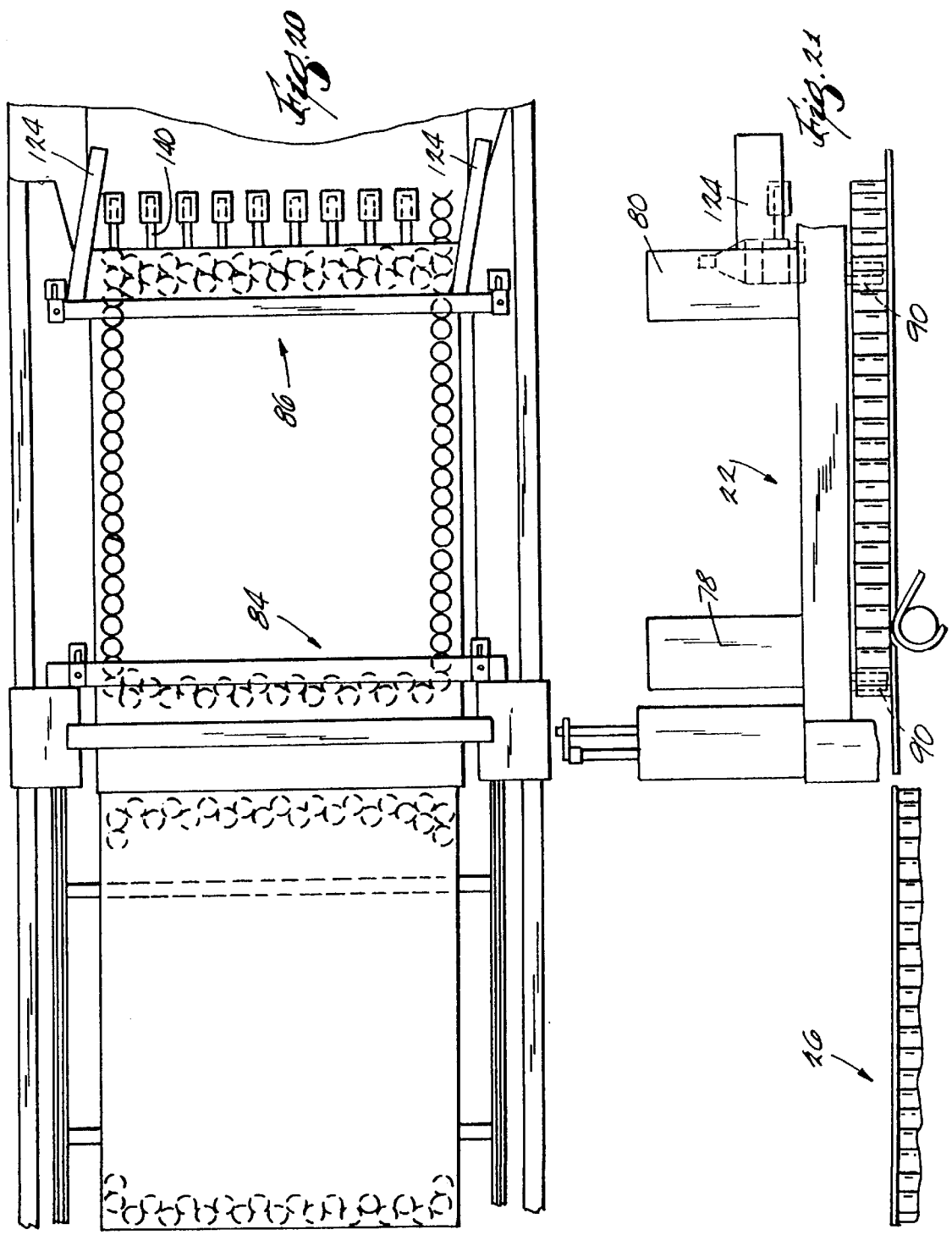

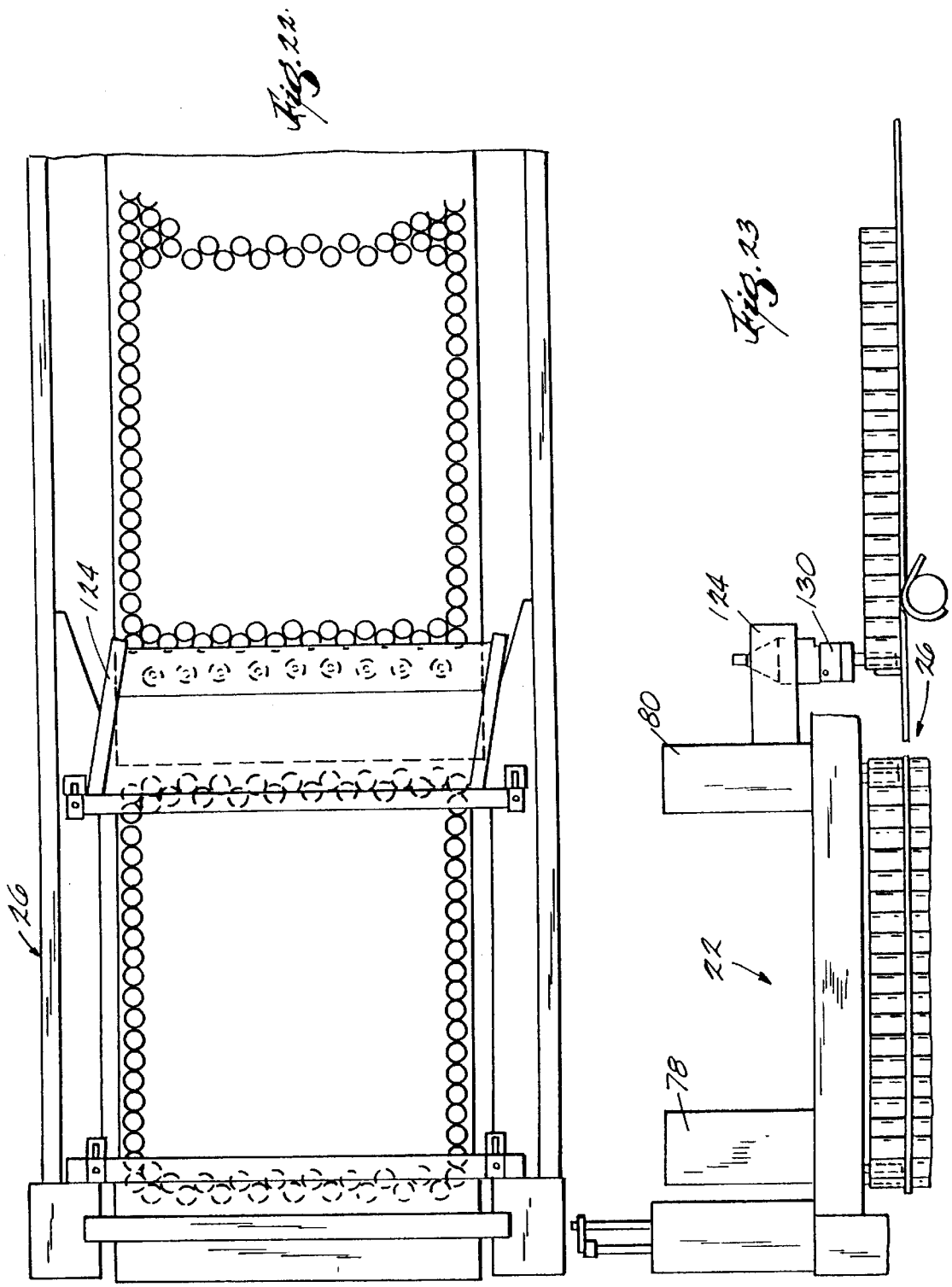

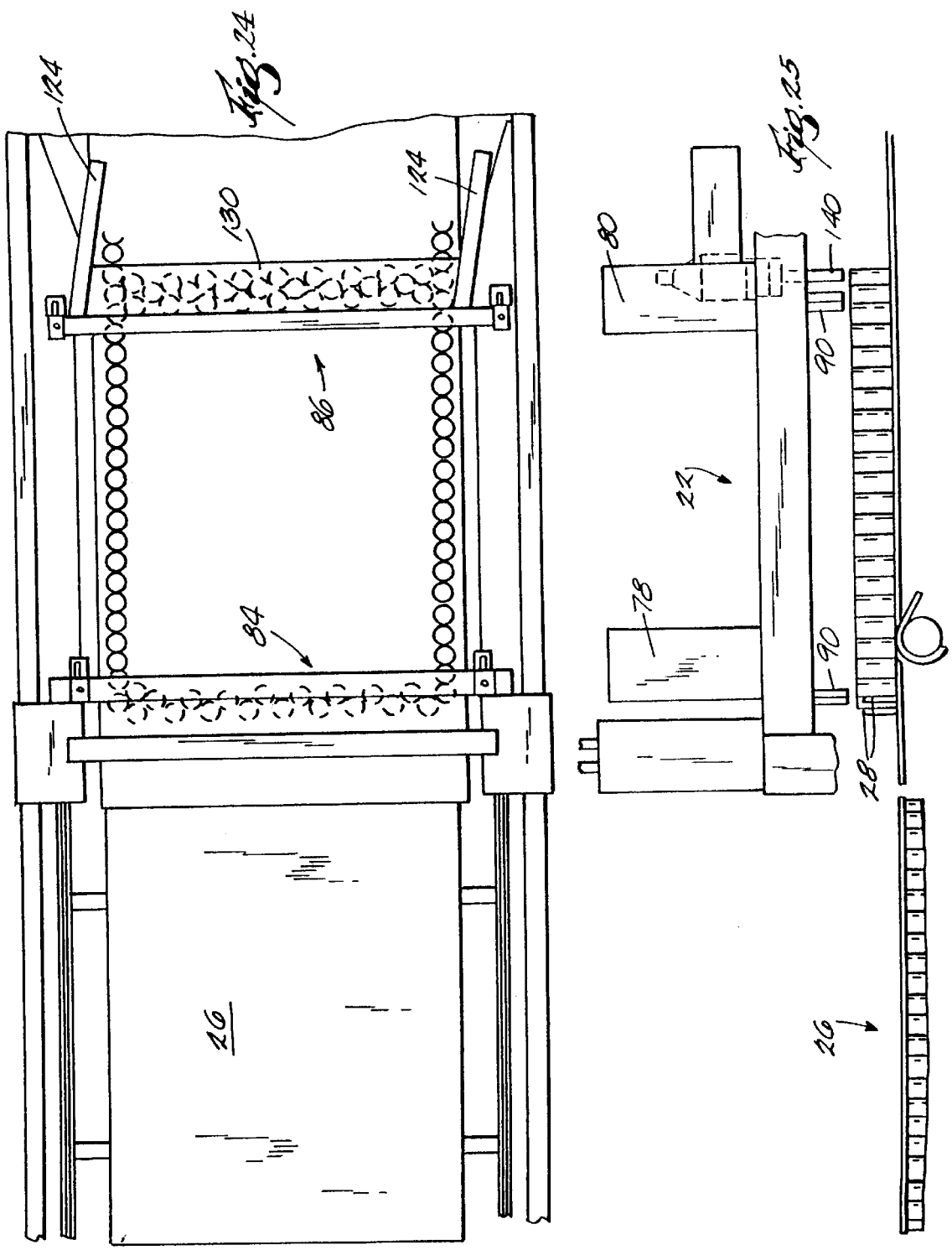

CONTAINER SWEEP FOR A PALLETIZER AND METHOD

RELATED APPLICATIONS

This application claims the benefit under 35 U.S.C. §119 of co-pending U.S. Provisional Patent Application Ser. Nos. 60/016,853; 60/017,014; and 60/016,845, all filed May 3, 1996.

BACKGROUND OF THE INVENTION

1. Technical Field

The invention relates generally to material handling systems, and particularly to palletizers for arranging articles on a pallet.

2. Related Prior Art

A palletizer is operable to arrange objects, such as beverage containers, into an organized pattern and place the objects onto a pallet. It is known to provide such palletizers with a container conveyor assembly for conducting a stream of containers. It is also known to provide a palletizer with "pattern-forming" apparatus to organize the conveyed objects into a pattern. U.S. Pat. No. 4,834,605, which issued to Jerred and which is titled "Apparatus for Palletizing Layers of Circular Containers Arranged in a Honeycomb Pattern", discloses one known apparatus for arranging a stream of generally circular containers on a conveyor into a "voidless" arrangement of nested, parallel rows of containers.

It is also generally known to provide a palletizer with apparatus to accumulate a portion of the stream of conveyed containers and to move the portion of the stream containers from the stream of conveyors onto a pallet. An example of such an accumulation and sweep assembly is disclosed in U.S. Pat. No. 5,271,709 which issued to VanderMeer et al. on Dec. 21, 1993 and which is titled "Device and Method for Repeatedly Forming a Preselected Arrangement of Conveyed Articles". It is also known to provide a palletizer with a pallet dispenser, a separator sheet dispenser and a main hoist for holding a pallet in a position to receive multiple tiers of containers and separator sheets.

SUMMARY OF THE INVENTION

The invention provides a palletizer including a container sweep assembly operable to repeatedly organize a stream of objects, such as containers on a conveyor, into a preselected pattern, and operable to transfer the containers in the preselected pattern onto a pallet. The container sweep assembly includes a container shift apparatus that removes selected containers from the stream of containers, and reinserts the containers into the stream at preselected positions to assure that the containers repeatedly move into the desired, preselected pattern.

More particularly, the invention provides a palletizer assembly including a container sweep assembly, an associated container shift apparatus, and a main hoist. The container placement apparatus and the sweep apparatus cooperate to receive a stream of containers that have been organized into a voidless pattern, and to segregated the stream of containers into a series of groupings or "patterns". The sweep assembly then transfers the pattern onto a pallet in the main hoist.

The sweep apparatus operates to repeatedly transfer a predetermined pattern of containers from a "sweep area" onto a pallet. Because of the staggered arrangement of containers when in a voidless pattern, the stream of containers moving along the conveyor to the sweep apparatus is not, without intervention, properly configured to provide repeated patterns. The container shift apparatus intervenes to rearrange selected containers in the stream without interrupting the advance of the stream. The container shift apparatus properly organizes the containers by shifting a number of containers in the stream to the lead edge of patterns being formed to make those patterns complete. In particular, the container shift apparatus temporarily removes containers from the stream of containers, and re-inserts the temporarily removed containers into a position occupying the lead edge of alternating patterns.

In one embodiment, the palletizer removes all but one of the containers in a row of containers from the stream, thereby leaving a single container in a row.

In another aspect of the invention, the sweep apparatus operates to permit the lines of containers to slide by the container that is left behind, thereby permitting the lead edge of the pattern being formed to attain the proper configuration without having to handle all of the containers in a row that is to be rearranged. This is accomplished by utilizing back pressure on the remaining lines of containers to push forward past the stagger caused by the "extra" can left behind by the container shifting apparatus numbered pattern. The remaining lines are pushed by back pressure and caused to slide by the "extra" can to move into the preselected, voidless pattern.

Among the advantages of the invention are the provision of a pattern forming apparatus that has few moving parts to remove the containers from the stream of containers and to re-introduce the containers to the lead edge of a pattern being formed. Also, the invention provides a pattern forming and sweep apparatus that does not require a number of containers to be recycled through the stream of containers. Rather, a minimum containers are handled, and are handled only a single time to accomplish the required rearrangement.

Other features and advantages of the invention will become apparent to those skilled in the art upon review of the following detailed description, claims and drawings.

DESCRIPTION OF THE DRAWINGS

FIG. 11 is a view taken generally along line 11—11 in FIG. 9.

FIG. 12 is a top view of the sweep assembly illustrated in FIG. 9 in the retreated and lowered position.

FIG. 13 is a side elevation view of the sweep assembly in the position shown in FIG. 12.

FIG. 14 is a top view of the sweep assembly shown in FIG. 9 in the advanced and lowered position.

FIG. 15 is a side elevation view of the sweep assembly shown in FIG. 14.

FIG. 16 is a top view of the sweep assembly shown in FIG. 9 in the advanced and raised position.

FIG. 17 is a side elevational view of the sweep assembly shown in FIG. 16.

FIG. 18 is a top view of the sweep assembly shown in FIG. 9 in the raised and retreat position.

FIG. 19 is a side elevation view of the sweep assembly shown in FIG. 18.

FIG. 20 is a top view of the sweep assembly shown in FIG. 9 and is similar to FIG. 12 illustrating the sweep assembly in the retreated and lowered position.

FIG. 21 is a side elevation view of the sweep assembly shown in FIG. 20.

FIG. 22 is a top elevational view of the sweep assembly shown in FIG. 9 and is similar to FIG. 14 illustrating the sweep assembly in the advanced and lowered position.

FIG. 23 is a side elevation view of the sweep assembly shown in FIG. 22.

FIG. 24 is a top elevation view of the sweep assembly shown in FIG. 9 and is similar to FIG. 18 illustrating the sweep assembly in the raised and retreated position.

FIG. 25 is a side elevation view of the sweep assembly shown in FIG. 24.

Figure 1:
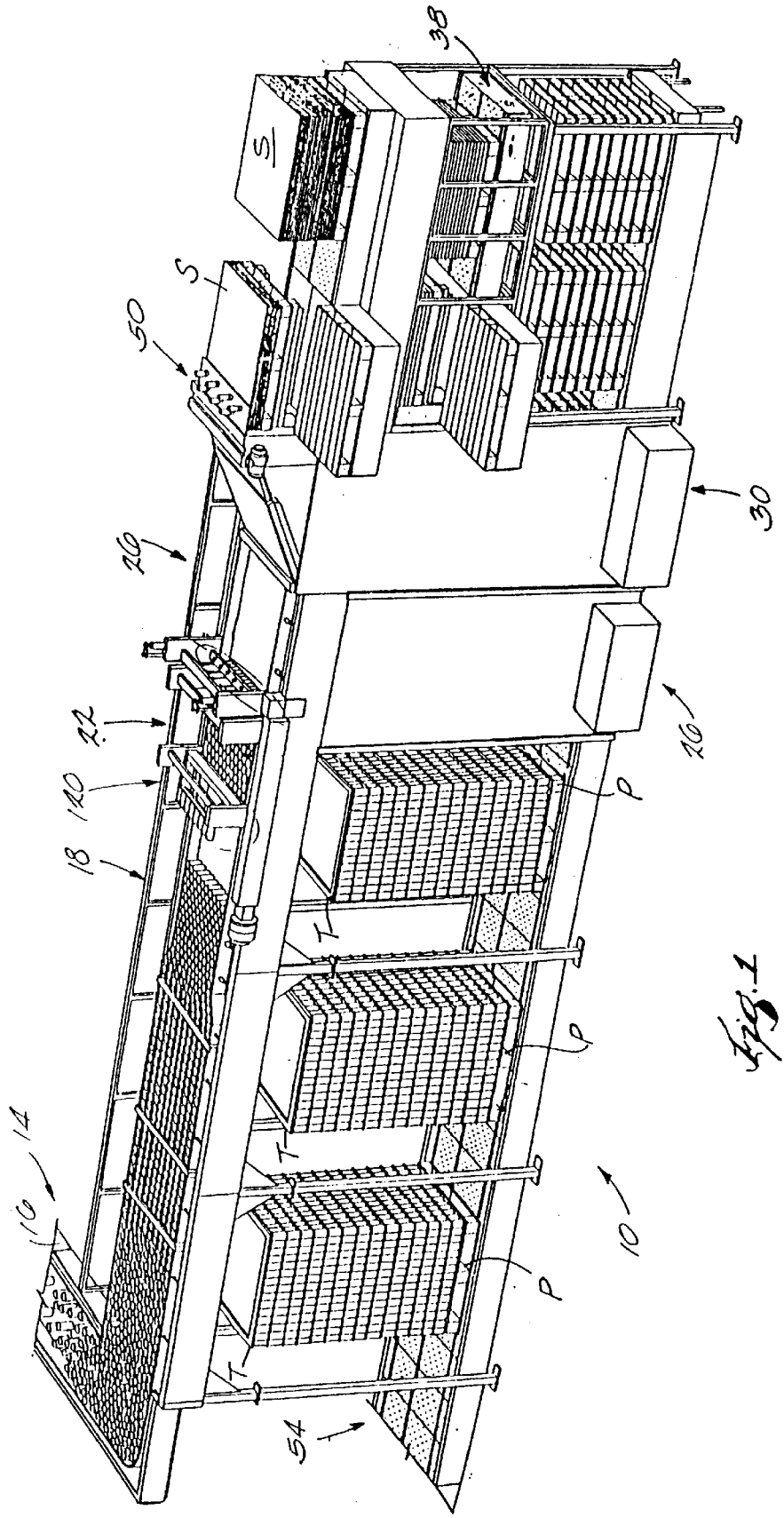
FIG. 1 is a perspective view of a palletizer assembly embodying the invention.
Figure 2:
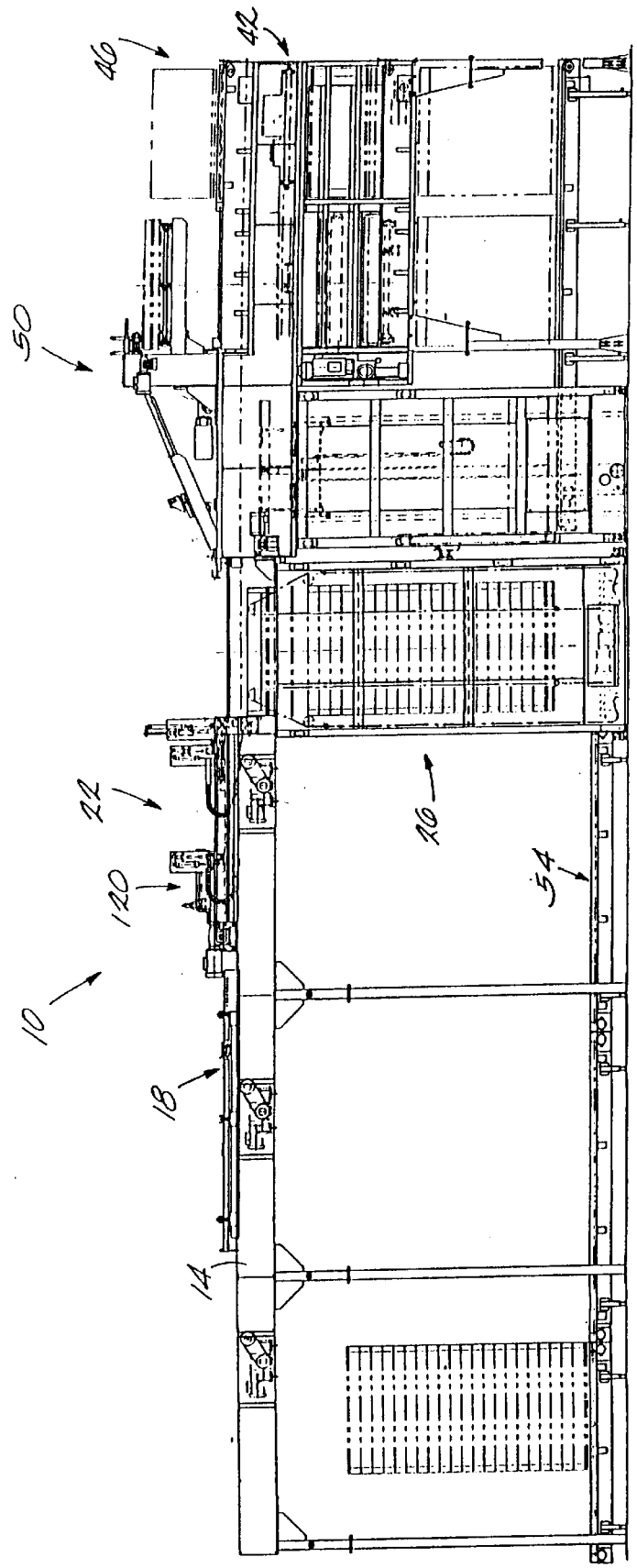
FIG. 2 is a side elevation view of the palletizer assembly shown in FIG. 1.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE PREFERRED EMBODIMENT

A palletizer assembly 10 embodying the invention is illustrated in the drawings. The palletizer 10 comprises (see FIG. 1) an elevated conveyor assembly 14 for conveying a stream of articles, such as beverage containers C onto a pallet P. The containers are denoted in the drawings generally by reference letter "C" and the pallets are denoted by the letter "P". The conveyor assembly 14 includes a conveyor drive belt 15 (shown in FIG. 13) providing a moving container support surface 16 for transporting a stream of containers C thereon. While the illustrated embodiment shows the use of a conveyor belt to transport the containers C, it will be readily understood that an air bed conveyor could also be successfully used as part of the conveyor assembly 14. The conveyor assembly 14 also includes (FIG. 4) a pair of generally parallel side rails 17 extending along the sides of conveyor belt 15 to retain the stream of containers C on the moving surface 16 as the containers C are conveyed.

The conveyor assembly 14 also includes (FIG. 1) a pattern former 18 for arranging the stream of containers C carried by the conveyor belt 15 into a voidless pattern. As generally shown in FIG. 1, the pattern former 18 confines the stream of containers C conveyed by the conveyor belt 15 and directs the containers C into lanes such that the containers C become aligned in staggered rows of containers.

As will be discussed in detail below, the plurality or stream of containers C exiting the pattern former 18 are in a voidless arrangement consisting of rows of containers C (a row of containers extends perpendicular to the direction of travel of the containers) and lines of containers C (a line of containers extends parallel to the direction of travel of the containers).

The palletizer assembly 10 also includes (FIG. 1) a sweep assembly 22 for repeatedly moving a discreet grouping or "pattern" of containers C from the stream of containers C exiting the pattern former 18 to a pallet P held by a main hoist 26 as a layer or tier of containers C. The sweep assembly 22 moves patterns of containers C from the conveying surface 15 to the upper portion of the main hoist 26 and either directly onto a pallet P or on top of a previous tier of containers C.

The palletizer assembly 10 also includes (FIGS. 12 and 13) a plurality of selectively retractable pattern stops 28 which extend upwardly through the container support surface 16 adjacent the main hoist 26. The pattern stops 28 are arranged to correspond with the profile of the staggered lead edge of an advancing stream of containers. In the illustrated embodiment, and for reasons discussed in detail below, the illustrated pattern stops 28 are arranged to correspond with the profile of a lead edge having a row of nine containers C and a second row having ten containers C.

The pallets P are delivered to the main hoist 26 by means of a pallet dispenser 30 and a pallet hoist 34 which receives a stack of pallets P from the pallet dispenser 30 and which lifts individual pallets P upwardly. The palletizer assembly 10 also includes a top frame dispenser 38 for dispensing a stack of top frames, and a top frame handler assembly 42 which moves individual top frames from the top frame dispenser 38 into the main hoist 26 and on top of a completed stack of containers C. The drawings denote top frames generally with reference letter "T".

The palletizer assembly 10 also includes a separator sheet dispenser 46 and a separator sheet handler assembly 50 for delivering individual separator sheets S from the separator sheet dispenser 46 to the main hoist 26. The separator sheets S are used to separate tiers of containers C stacked on a pallet P. The palletizer assembly 10 also includes a complete stack conveyor 54 which is located at the bottom of the main hoist 26 for receiving a completed stack comprising a pallet supporting multiple tiers of containers C with separator sheets S therebetween and a top frame T supported by the uppermost tier of containers C.

The pallet dispenser 30, pallet hoist 34 and the top frame handler assembly 42 are further described in the following co-pending International patent applications which are assigned to the assignee hereof and which are incorporated herein by reference: Ser. No. 09/180,170, filed concurrently herewith and titled "Pallet and Top Frame Handler for a Palletizer and Method of Handling a Pallet and Top Frame in a Palletizer" and Ser. No. 09/180,168, filed concurrently herewith and titled "Separator Sheet Handler for a Palletizer".

Figure 5:
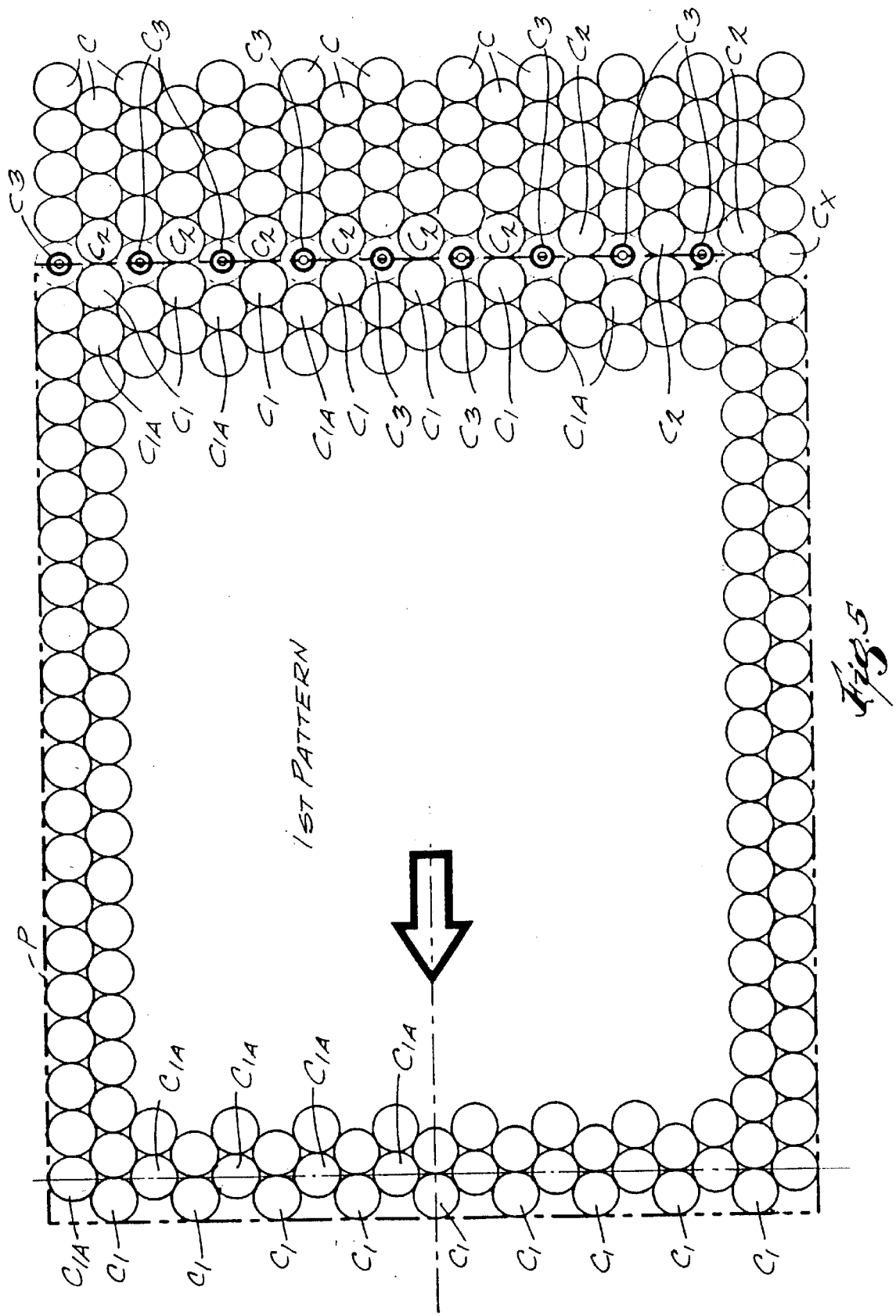
FIG. 5 is a schematic illustration of a first pattern of containers formed by the palletizer shown in FIG. 1 and prepared to be transferred onto a pallet.

FIGS. 5–8 schematically illustrate the operation of palletizer assembly 10 to repeatedly form groupings or patterns of containers 10. With reference to FIG. 5, (which shows the direction of travel of the containers passing from right to left), the stream of containers C exiting the pattern former 18 are arranged in nested, staggered rows of containers C and lines of containers C. A row of containers C is comprised of containers C having a common center line extending perpendicular to the direction of travel, and a line of containers is comprised of containers having a common center line extending parallel to the direction of travel.

In order to most efficiently load a pallet P with a portion of the container stream, it is necessary to arrange the containers C into a pattern having a front row, a rear or last row, and a plurality of rows therebetween. The first and last rows of a pattern of containers C must be arranged so that the corners of the pallet P on which the pattern is to be supported remain unoccupied. This condition is necessary because the supporting surface provided by the corner of the pallet P is insufficient to provide stable support of an additional container located on the corner.

Given this condition, the second row and next to last row of containers C in a pattern may extend to the edge of the pallet P and be supported with sufficient stability. In this regard, FIG. 5 is illustrative. FIG. 5 shows the outline of pallet P in phantom superimposed on the stream of containers. The lead row (with respect to the direction of travel) includes 9 containers identified as $C_1$, and the last row also includes 9 containers, also identified as $C_1$.

The pattern also has a second row of containers identified as $C_{1A}$ including 10 containers, and a next to last row, immediately forward and adjacent the last row, including 10 containers $C_{1A}$.

FIG. 5 thus illustrates 19 lines of containers C extending parallel to the direction of travel and across the width of the pallet P.

Also as shown by FIG. 5, when in a voidless arrangement, the center lines (two shown in FIG. 5) of adjacent rows of containers C are staggered by a distance of ½ the diameter of the containers. Similarly, the center lines of adjacent lines of containers C are spaced apart by the distance of ½ the diameter of the containers.

After this first pattern of containers C shown in FIG. 5 is removed from the stream of containers by operation of sweep assembly 22 in a manner discussed below, the remaining forwardmost row of containers continues to advance in the direction of travel. In FIG. 5, this leading edge of the stream has its center line on the edge of the pallet P (which is why this row of containers is not included in the first pattern), and would, without intervention or rearrangement, become the front row of the next or second pattern. However, rearrangement is required because the leading edge of the advancing stream following transfer of the first pattern comprises 10 containers C, not the required 9 containers C.

Stated otherwise, a pattern comprised of rows having a number of containers totalling n and n–1 (wherein n equals the greatest number of containers in any of the rows of the pattern), the first or front row of the pattern must total n–1 containers, and the last row of containers must also include a total of n–1 containers.

One of the problems presented by handling containers C and solved by the palletizer assembly 10 is the presence of the advancing row of containers C following the first pattern and including a number of containers totaling n, rather than the required n–1 number of containers. The means by which the palletizer assembly 10 rearranges the stream of containers C to provide a row having the requisite n–1 containers, i.e., 9 containers in the illustrated embodiment, is explained generally below. This process is illustrated in FIGS. 5–8 and will be later explained in detail.

The sweep assembly 22 reorganizes selected rows of containers in the stream of containers by temporarily removing a predetermined number of containers, namely n–1 containers, from a row including n containers, and reinserting the "picked" or temporarily removed containers into the stream as a row of n–1 containers that is used as a front row of containers for a pattern. This rearrangement process is accomplished by lifting the "picked" containers C from the stream, shifting each container C from the original line occupied by the picked container a distance equal to ½ container diameter to the next adjacent line of containers, and reinserting the picked containers into the stream.

This "picking" and "shifting" process removes n–1 containers from a row originally including n containers, i.e., removes 9 of 10 containers in the illustrated example. Accordingly, a single container C remains as the only container in a row at the lead edge of an advancing stream of containers. This single can is followed by a row which includes n–1 containers and which, therefore, is suitable as a front row for a pattern.

As is also described with particularity below, the sweep assembly 22 affords passage of the advancing stream of containers past the single container C left by the "picking" and "shifting" steps, such that a row comprising n–1 containers C advances to the front row of the second pattern formed by the sweep apparatus 22, and subsequently transferred into the main hoist 26. This "slide by" step occurs repeatedly in the formation of each of the second, fourth, sixth and subsequent even patterns formed by the palletizer assembly 10. Similarly, the "picking" and "shifting" steps occur repeatedly in the formation of each of the first, third, fifth and subsequent odd patterns formed by the palletizer 10.

With particular reference to FIG. 5 and as described above, the first pattern includes a front row containing 9 (n–1) containers indicated by $C_1$, and a last row of 9 (n–1) containers identified by $C_1$. The next forwardmost row not part of the first pattern includes 10 (n) containers, 9 of which are identified as $C_3$ and 1 of which is identified as container CX. The row of containers positioned immediately upstream of the row comprising containers $C_3$ and CX includes 9 (n–1) containers identified by $C_2$.

Figure 6:
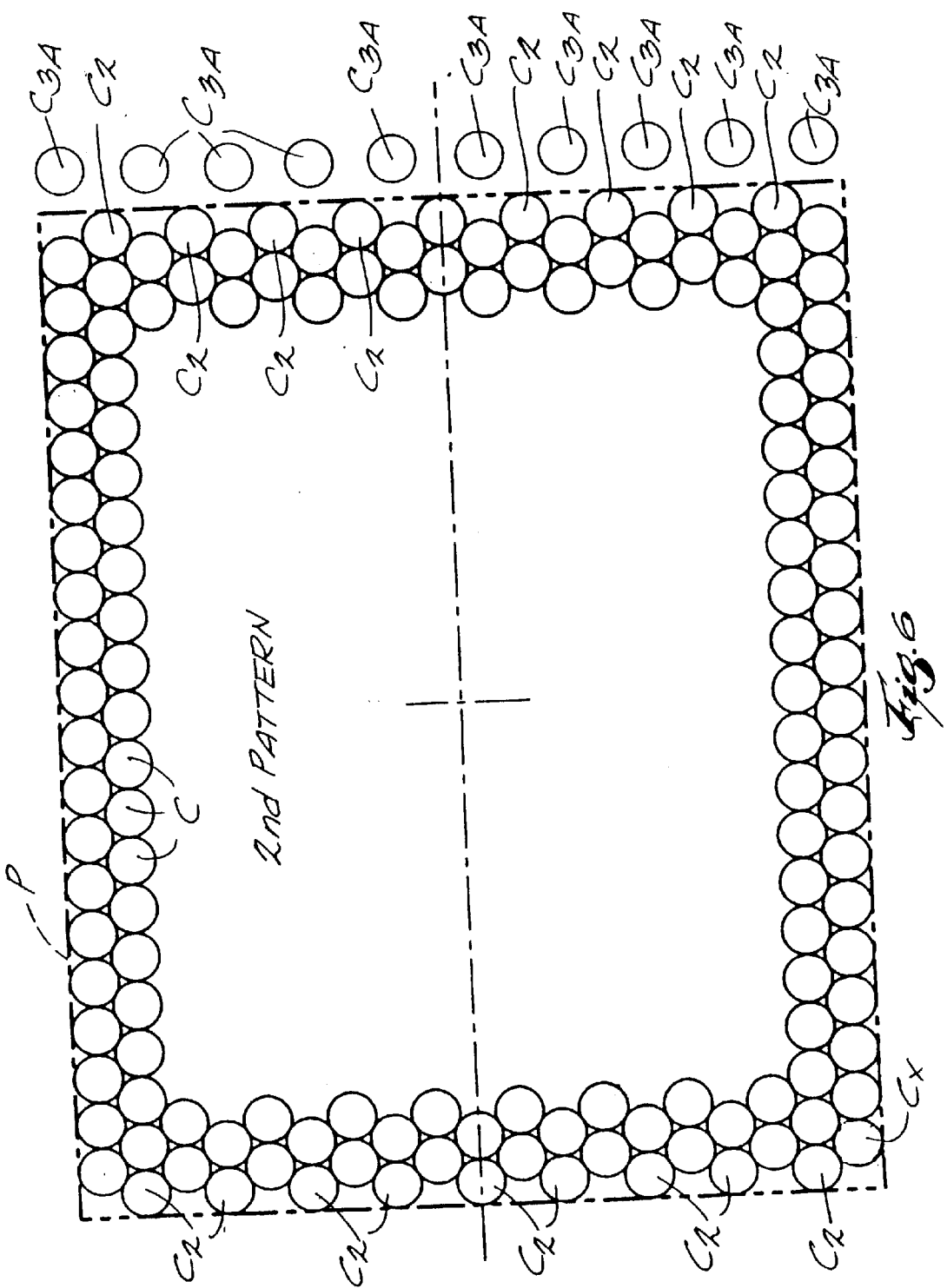
FIG. 6 is a schematic view similar to FIG. 5 illustrating a second pattern of containers.

With particular reference to FIG. 6, the second pattern formed by the palletizer assembly 10 is shown. Containers $C_2$ comprising the front row have passed container CX by the slide by step such that container CX occupies a position in the second row of the second pattern. The last row of the second pattern is also comprised of 9 (n–1) containers identified by $C_2$. FIG. 6 also shows the next most forward row of containers, which are identified as $C_{3A}$, which total 10 (n) containers, and which become the second row of containers in the third pattern in the manner described below.

Figure 7:
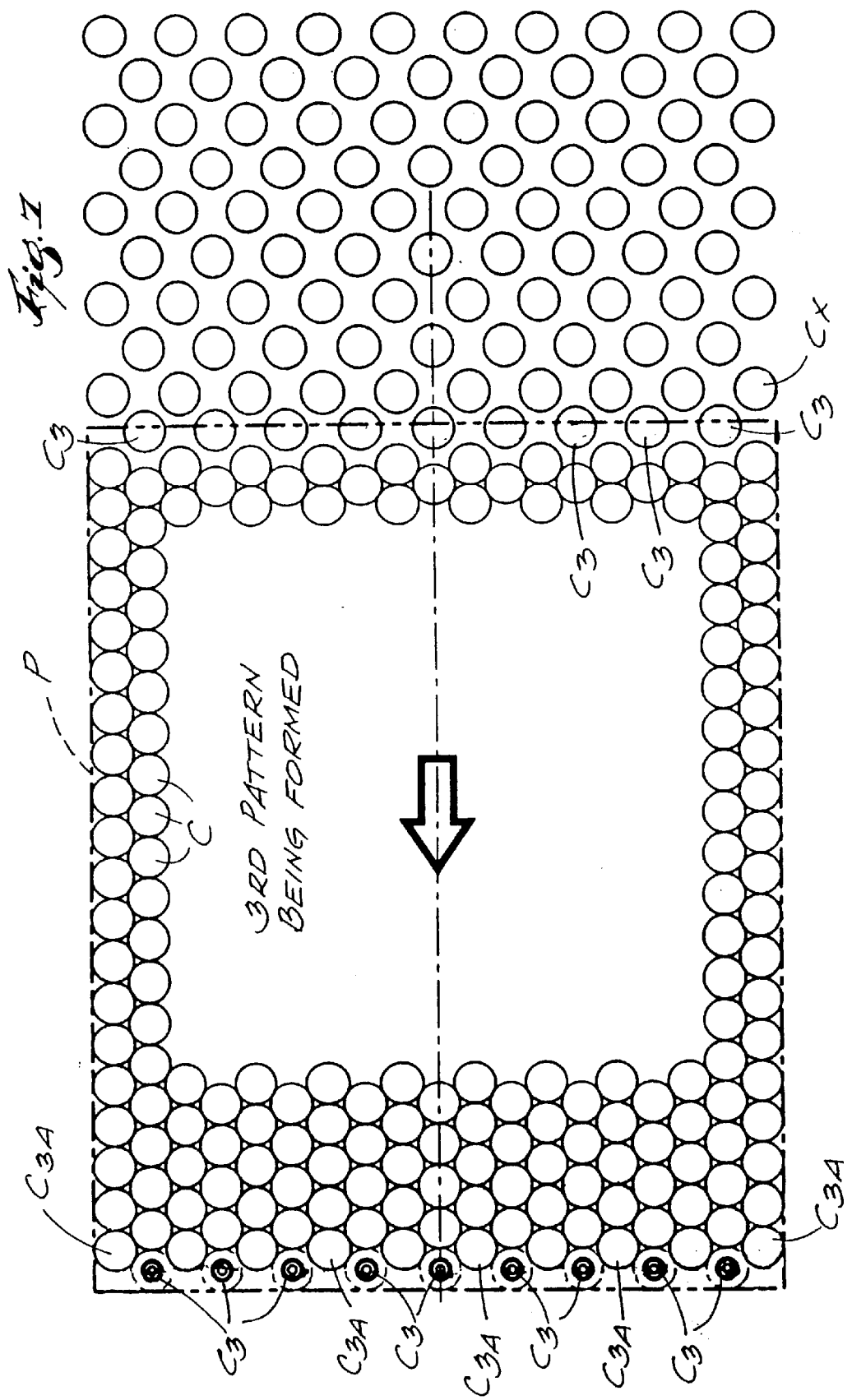
FIG. 7 is a schematic view similar to FIG. 5 illustrating a third pattern of containers being formed.

With particular reference to FIG. 7, which illustrates the third pattern being formed by the palletizer assembly 10, the containers $C_3$ that were removed from between the last row of containers $C_1$ in the first pattern and the front row of containers $C_2$ in the second pattern are inserted into the stream as a row immediately in advance of the row of 10 (n) containers $C_{3A}$, and are shifted in unison into position to occupy the 9 (n–1) lines that are filled by a row serving as a front row or last row in a pattern.

Figure 8:
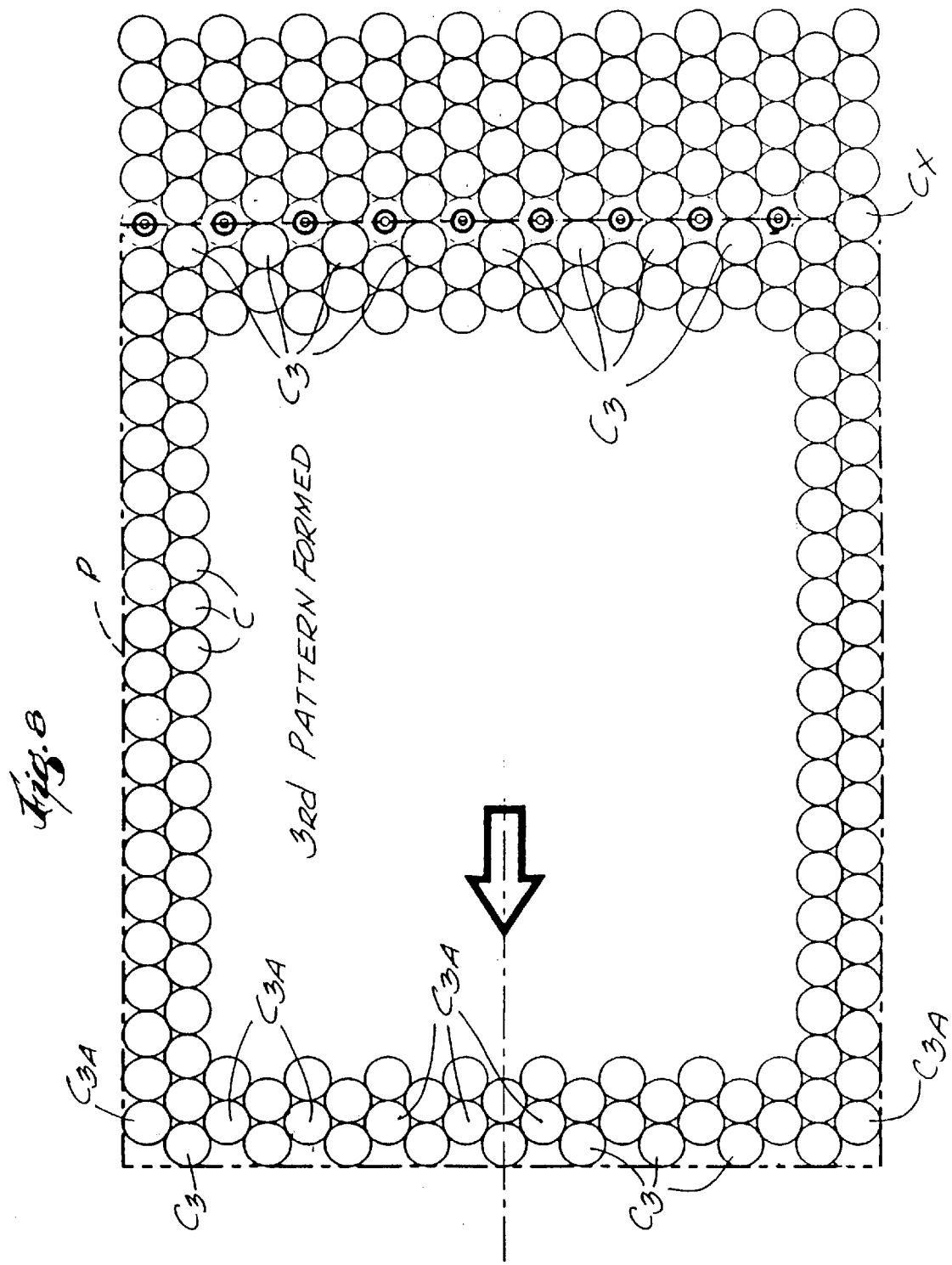
FIG. 8 is a schematic view similar to FIG. 5 illustrating the third pattern of containers as formed by the palletizer.

After the containers $C_3$ are repositioned into the stream as the front row of the third pattern, the next row of 10 containers $C_{3A}$ advances and fills in behind the front row of containers $C_3$. The last row of containers in the third pattern are shown in FIG. 7 as containers $C_3$ and as crossing the outline of a pallet P, and are shown in FIG. 8 as occupying the last row of the third pattern. The third pattern illustrated by FIG. 8 is identical to the first pattern shown in FIG. 5 and the second pattern shown in FIG. 6, and the above described process is repeated with respect to the formation of the fourth, fifth, etc. . . . patterns.

The construction and operation of the palletizer 10 and sweep assembly 22 to carry out this repeated arrangement and rearrangement of the containers C is set forth below.

Figure 3:
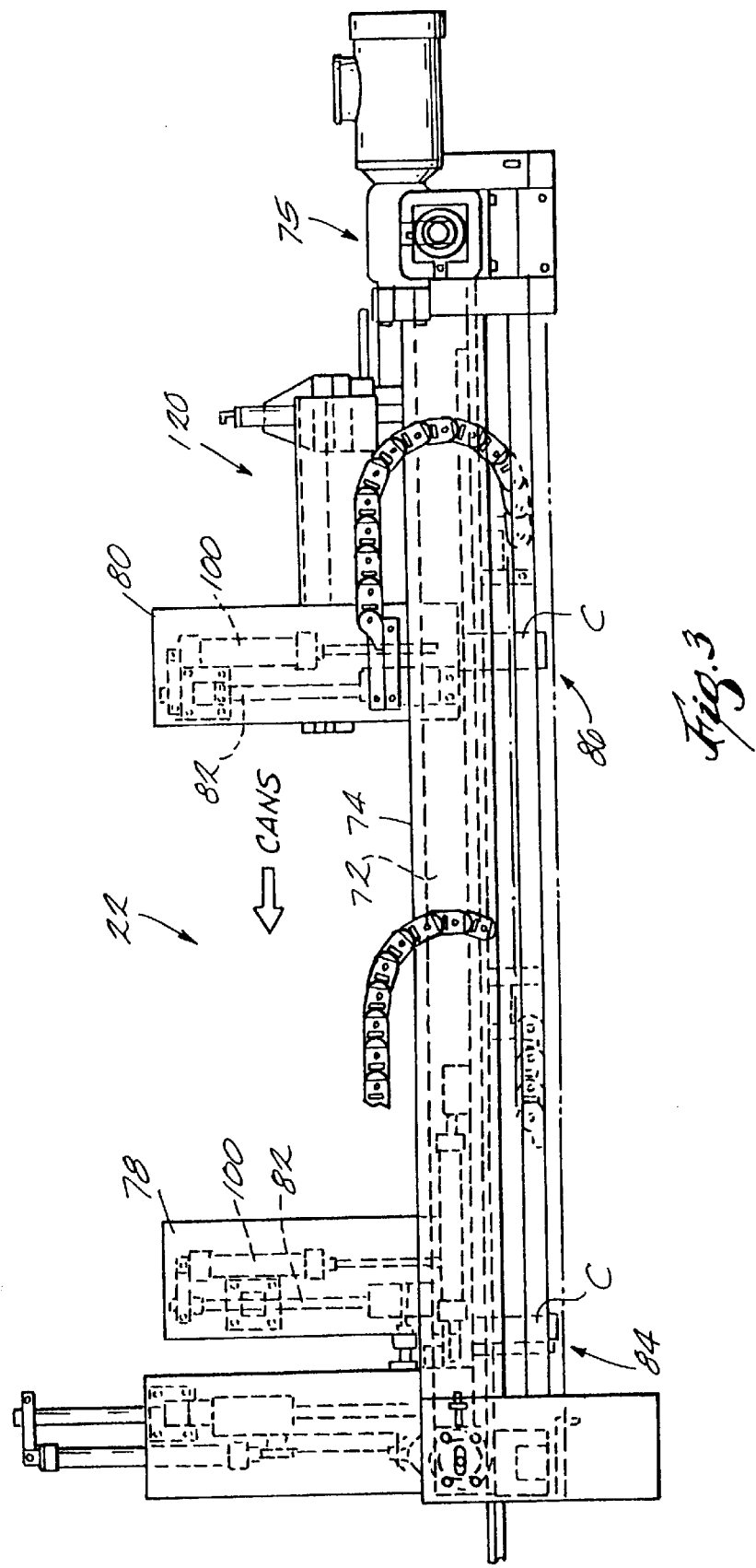
FIG. 3 is an enlarged side elevation view of the sweep assembly which is part of the palletizer shown in FIG. 1.
Figure 4:
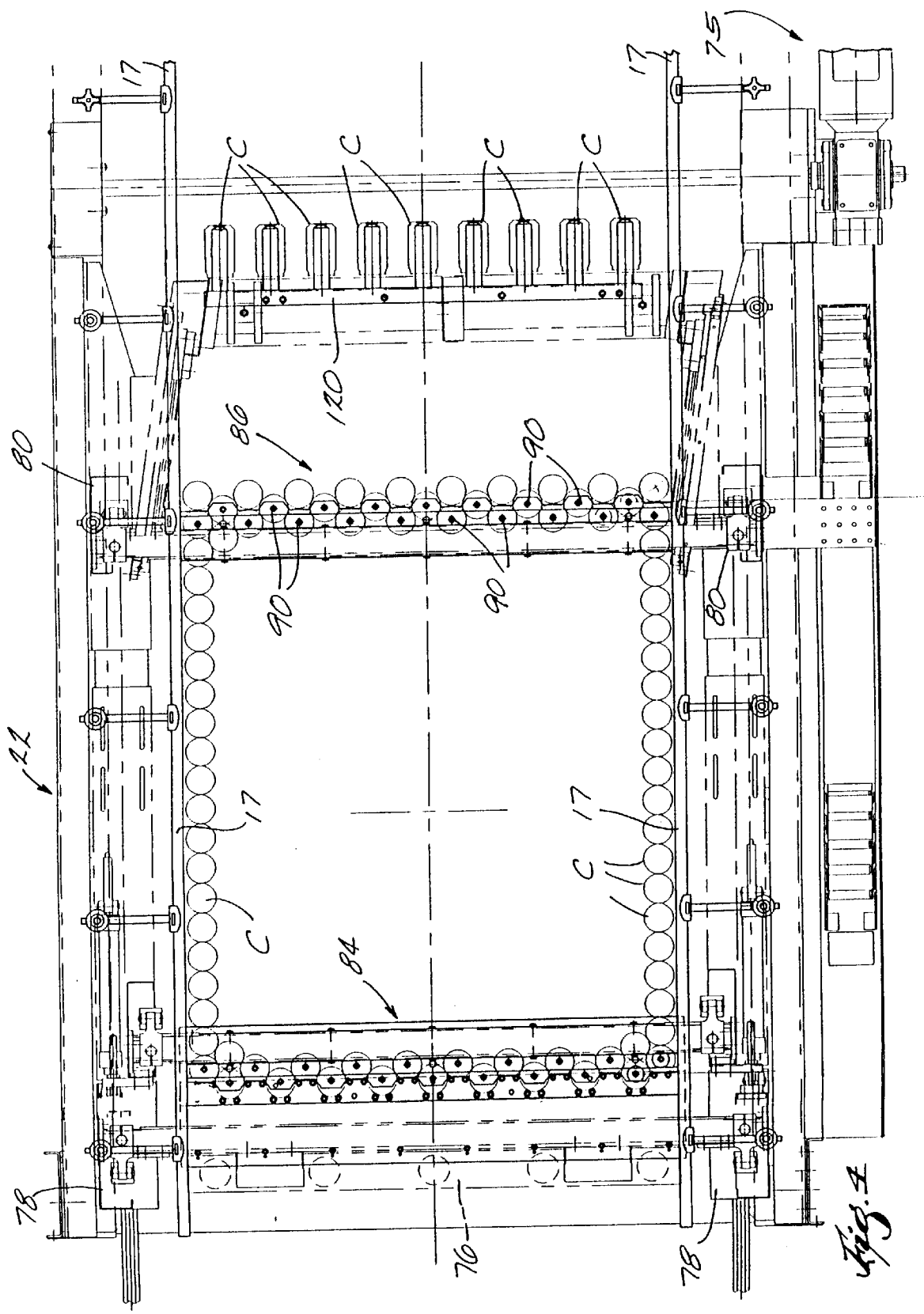
FIG. 4 is a top view of the sweep assembly illustrated in FIG. 5.

Referring now to FIGS. 3 and 4, the sweep assembly 22 includes a frame 70 having a pair of generally parallel side members 72 positioned on opposite sides of the conveyor assembly side rails 17. The side members 72 are supported by roller assemblies (not shown) for reciprocal movement relative to the conveyor support surface 16 along a pair of sweep assembly support rails 74. The sweep assembly 22 is reciprocated between a upstream or "retreat" position (Shown in FIG. 9) wherein the sweep assembly is located adjacent the main hoist 26 and an advanced or downstream position (Shown in FIGS. 14 and 15) wherein the sweep assembly 22 is located over the main hoist 26 by means of a belt drive 75 shown in FIGS. 3 and 4.

The frame 70 also includes a cross member 76 extending between the side members 72. The cross member 76 extend generally perpendicular to the direction of travel of the containers C and are located above the container supporting surface 16 (shown in phantom in FIG. 3).

As best shown in FIG. 3, the sweep assembly 22 also includes a pair of forward or downstream stanchions 78 that extend vertically upward from respective side members 72. The sweep assembly 22 also includes a pair of rearward stanchions 80 extending vertically upward from the upstream ends of the side members 72. Each of the pairs of stanchions 78, 80 include a generally vertically extending slide 82 having a lower end connected to a side member 72 and in upper end supported by the upper end of the associated stanchion 78,80.

The sweep assembly 22 also includes a forward plunger assembly 84 which extends across the container support surface 16 between the side members 72 and adjacent the forward cross member 76. The sweep assembly 22 also includes a rearward plunger assembly 86 located at the upstream end of the frame 70 and extending between the side members 72.

Figure 9:
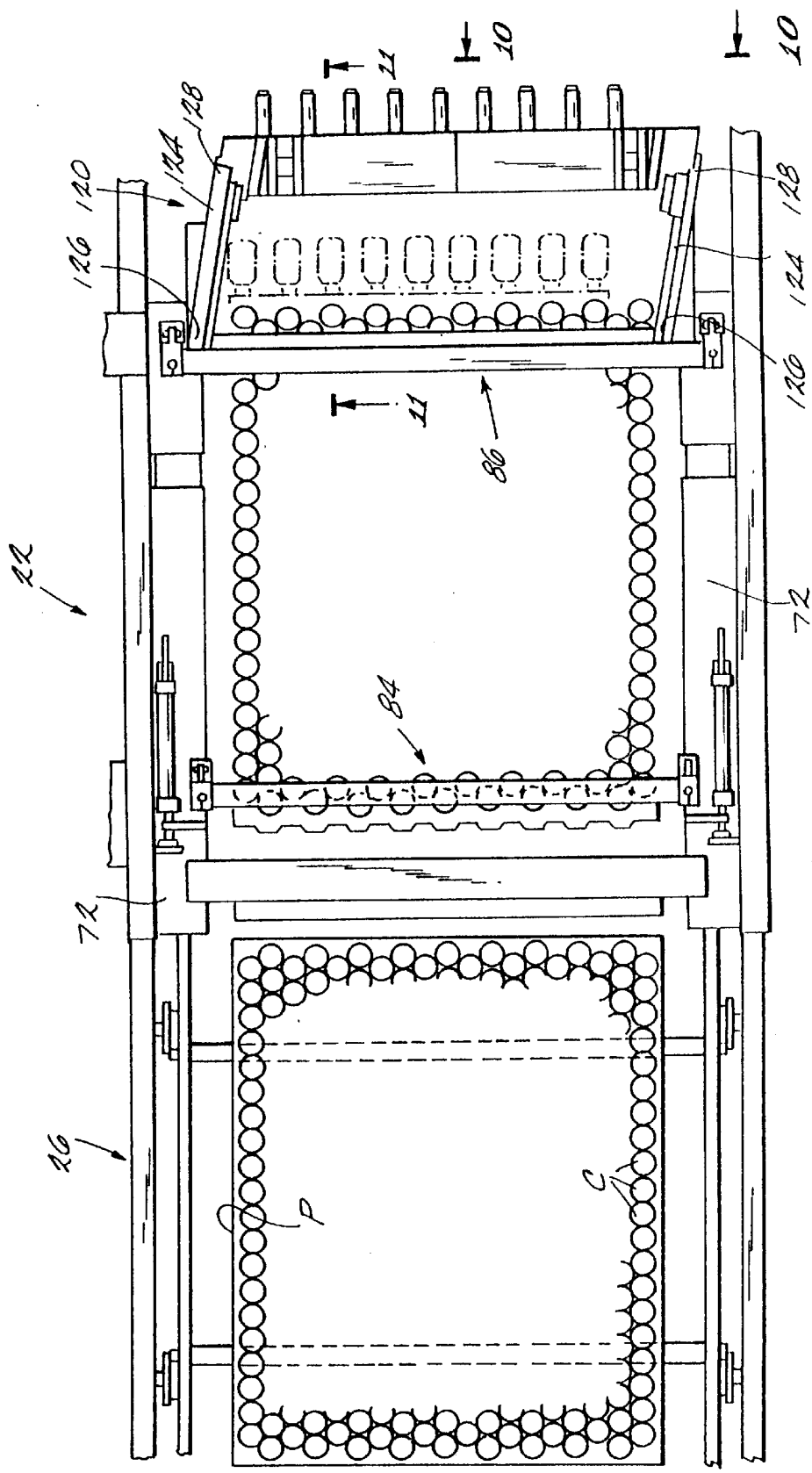
FIG. 9 is a view similar to FIG. 4 illustrating the sweep assembly in the retreated position.
Figure 10:
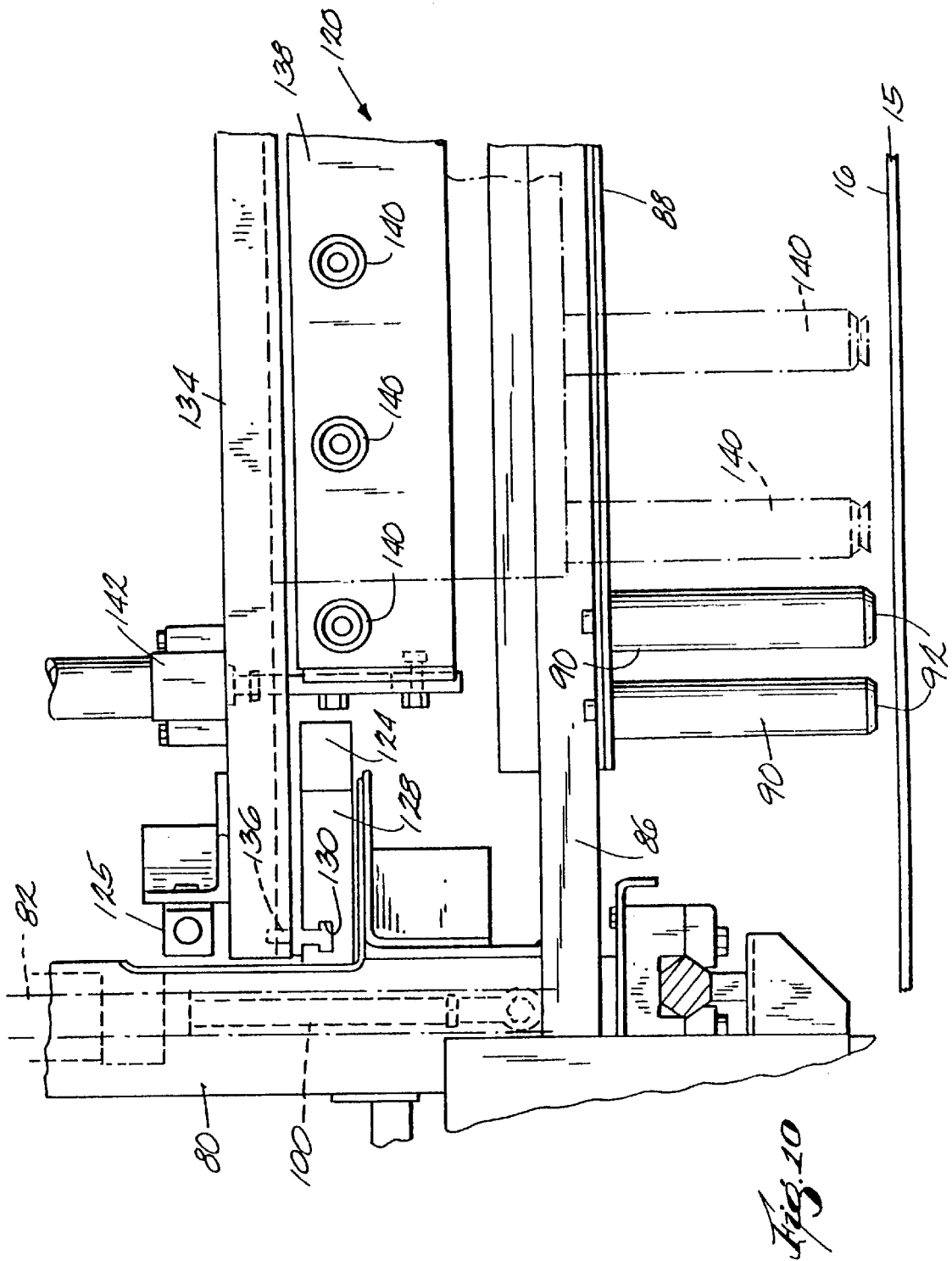
FIG. 10 is a view taken generally along line 10—10 in FIG. 9.

The forward plunger assembly 84 and rearward plunger assembly 86 are similarly constructed and operate in a similar manner. Accordingly, only the rear plunger assembly 86 will be described in detail. With reference to FIGS. 9–11, the rear plunger assembly 86 includes a plunger support 88 having opposite ends slidably supported at its opposite ends by the respective slides 82 on the rearward stanchions 80. The plunger support 88 is slidable along the slides 82 between a lowered position (shown in FIGS. 9 and 10) and a raised position (shown in FIGS. 17, 19 and 25).

The rear plunger assembly 86 also includes a plurality of cylindrical, finger-like plungers 90 which are fixed to, and extend downwardly from, the plunger support 88 toward the container support surface 16. As best shown in FIG. 10, each of the plungers 90 has a distal end 92 that, when the plunger support 88 is lowered, is spaced from the container support surface, 16 and have a diameter appropriately sized to be received by the interior of a container C.

As shown in FIG. 4 and in FIG. 11, the plungers 90 are arranged in a staggered pattern extending along the length of the plunger support 88 such that the center line of each plunger 90 will be centered over the interior space of a container C. In this regard, in the illustrated embodiment, the rear plunger assembly 86 includes a total of nineteen plungers 90, ten of which are positioned relatively downstream and 9 of which are positioned relatively upstream. The positions of the plungers 90 across the plunger support 88 are spaced apart approximately ½ of a container diameter and are centered on the center lines of containers C passing along the container support surface 16. Thus, as the stream of containers C passes under the plunger support 88, the plungers 90 can be registered with individual containers. Even more particularly, the downstream plungers 90 are engageable with a row of 10 (n) containers, and the upstream plungers 90 are registerable and engageable with the containers in a row of 9 (n–1) containers.

The rear plunger assembly 86 also includes means for selectively and repeatedly moving the plunger support 88 between the lowered position and the raised position. While various suitable alternative arrangements could be used, in the illustrated embodiment, the rear plunger assembly 86 includes a pair of rear plunger assembly lift actuators 100 on the rearward stanchions 80 and adjacent the slides 82.

As mentioned above, the forward plunger assembly 84 is constructed and operates in a manner similar to the rearward plunger assembly 86, including the provision of a staggered row of plungers 90 extending across the container support surface 16 and the ability to move between a lowered position and an upper position by virtue of selective actuation of an actuator.

As thus far described, therefore, the sweep assembly 22 is movable in two respects: first, the sweep assembly 22 is movable between the retreated position wherein the frame 70 is located adjacent the main hoist 26 and wherein the forward and rearward plunger assemblies 84, 86 defined therebetween a staging area in which a series of rows of containers C are formed into a pattern to be transferred to the main hoist 26, and an advanced position wherein the frame 70 is moved over the main hoist 26 into registry with a pallet P supported by the main hoist 26. When the sweep assembly 22 is in the advanced position, the forward and rearward plunger assemblies 84, 86 are located over the pallet P.

The sweep assembly 22 is also movable between a lowered position wherein the plunger support 88 is lowered, and the forward and rearward plunger assemblies 84, 86 are positioned so that the distal ends 92 of the plungers 90 are in closely spaced relation to the container support surface 16. The sweep assembly 22 can also be moved into a raised position wherein the plunger support 88 is raised along the slides 82. When the plunger support 88 is raised, the forward and rearward plunger assemblies 84, 86 are also raised from the container support surface 16 so that the distal ends 92 of the plungers 90 are positioned above the plane defined by the uppermost extent of the containers C advancing along the container support surface 16.

The sweep assembly 22 also includes (FIGS. 9 and 10) a container shift assembly 120 that is supported by the frame 70 adjacent the rearward plunger assembly 86. The container shift assembly 120 includes a pair of shifter slide rails 124 extending rearwardly or upstream from respective ends of the rearward plunger support 88. As shown in FIGS. 9 and 10, the downstream ends 126 of the shifter slide rails 124 are located adjacent and supported by the ends of the rearward plunger support 88 and, therefore, are raised and lowered with the rearward plunger assembly 86. The upstream ends 128 of the shifter slide rails 124 are offset approximately ½ of a container diameter in a direction perpendicular to the direction of travel of the containers C such that the shifter slide rails 124 are parallel and extend upstream from the shifter support bar 122 at an angle with respect to the direction of travel. A single end 128 of a slide rail 124 is shown in FIG. 10. Consequently, the offset between the downstream and upstream ends 126, 128 of the shifter slide rail 124 is equal to the distance between the center lines of adjacent lines of containers C. The shifter slide rails 124 each include a track 130 (shown in FIG. 10) extending between the ends 126, 128 of the shifter slide rail 124, and each slide rail 124 extends generally horizontally.

The container shift assembly 120 also includes (FIGS. 9–11) a vacuum fitting assembly 132 which is supported by the shifter slide rails 124 for movement relative to the rear plunger assembly 86. More particularly, the vacuum fitting assembly 132 includes a cross bar 134 having opposite ends (one shown in FIG. 10) supported by a respective shifter slide rail 124.

The vacuum fitting assembly 132 also includes (FIG. 10) a pair of journal assemblies 136 located respectively at each end of the cross bar 134 and supporting the cross bar 134 for sliding movement along the shifter slide rails 124. In this regard, each journal assembly 136 cooperates with the elongated track 130 in the shifter slide rail 124 to permit movement, by means of actuator 125 connected to the rearward plunger assembly support 88 and the cross bar 134, of the cross bar 134 between (FIG. 13) a first or pickup position located adjacent the downstream ends 126 of the rails 124 and the rearward plunger assembly 86 and (FIG. 11) a second or drop off position wherein the cross bar 134 is moved along the rails 124 toward the upstream end 128 and is extended away from the rearward plunger assembly 86.

The vacuum fitting assembly 132 also includes a vacuum fitting plate 138 that is supported by the cross bar 134 and that extends between the rails 124. The vacuum fitting plate 138 is generally located below the cross bar 134 and, for reasons explained below, is supported by the cross bar 134 for pivotal movement relative thereto.

The vacuum fitting assembly 132 also includes a plurality of finger-like, generally cylindrical vacuum fittings 140 extending in a single line across the length of the vacuum fitting plate 134. The vacuum fittings are connected to a vacuum (not shown) for lifting containers C in which the vacuum fittings 140 are housed. The vacuum fittings 140 are spaced apart such that the center line of adjacent vacuum fittings 140 are spaced apart by a distance of a container diameter. In the illustrated embodiment, therefore, the vacuum fitting assembly 132 includes 9 (n−1) such vacuum fittings 140. However, it will be readily understood that the vacuum fitting assembly 132 requires a total of n−1 fittings 140 wherein n equals the greatest number of containers in any row of containers C formed by the palletizer 10.

As mentioned above, the vacuum fitting plate 138 is supported by the cross bar 134 for pivotal movement relative thereto between a first or "down" position wherein the vacuum fittings 140 extend generally vertically and are closely spaced to the container support surface 16 when the container sweep assembly is in the lowered position, and a second or up position wherein the vacuum fittings 140 extend generally horizontally and point rearwardly or upstream of the vacuum fitting plate 134.

The container shift assembly 120 also includes a vacuum fitting fixture actuator 142 connected to the vacuum fitting plate 138 for selectively pivoting the vacuum fitting plate 138 between the down position and the up position.

When the vacuum fitting assembly 132 is pivoted into the down position and the vacuum fitting plate 134 is retracted into the pickup position immediately upstream of the rearward plunger assembly 86, the vacuum fittings 140 are positioned so as to occupy 9 of the 19 lines extending across the container support surface 16. More particularly, the 9 positions occupied by the vacuum fittings 140 are the 9 positions in a row of 10 containers that are occupied by the containers to be picked up through execution of the above-described container shifting process. This position is shown in phantom in FIG. 10.

When the vacuum fitting assembly 132 is extended along the shifter slide rails 124 to the second or drop off position, by virtue of the angled orientation of the slide rails 124, the vacuum fittings 140 are shifted or move the amount of the offset of the slide rails 124 into an adjacent line of containers C. This offset of the vacuum fittings 140 is also shown in FIG. 10. When the vacuum fitting plate 138 is pivoted into the down position and the cross bar 134 is moved into the extended position, the vacuum fittings 140 register with the plungers 90 in the rear plunger assembly 86 which engage the last row of containers C in a pattern of containers (i.e., the plunger 90 in the plunger assembly 86 which is second from the left as shown in FIG. 10).

The container sweep assembly 22 is thus moveable in four different aspects: the sweep assembly 22 can be moved between the advanced and retreated positions, and, with the forward and rearward plunger assemblies 84, 86 can be moved between the lowered and raised positions; the cross bar 134 can be moved between the retracted and extended positions; and the vacuum fitting plate 138 can be pivoted between the down and up positions.

The container sweep 22 operates as follows to rearrange a stream of containers C in a voidless pattern into patterns of containers C having a front row of n−1 containers and a last row of n−1 containers. Particularly, and with reference to FIG. 12, the operation of the palletizer assembly 10 will be described with the container sweep 22 being in an initialized position wherein the container sweep assembly 22 is in the retreat position and is in the lowered position.

When in the initialized position, the container shifter assembly 120 is in the retracted position and the vacuum fitting assembly 132 is pivoted downward. When so positioned, the container sweep assembly 22 introduces plungers 90 along the forward plunger assembly and along the rearward plunger assembly 86 into the containers which respectively are the first and last rows of the first pattern. At this time the vacuum fittings 140 in the container shift assembly 120 apply a vacuum to the bottom of the respective containers C in which the vacuum fittings 140 are housed thus picking up the 9 containers in the row immediate following the last containers of the first pattern.

Next, as shown in FIGS. 14 and 15, the container sweep apparatus 22 moves forward toward the advanced position. The first pattern of containers also advances by virtue of engagement of the forward and rearward plunger assemblies 84, 86 with the first and last rows of containers. The container sweep assembly 22 moves forward at a rate sufficiently faster than the rate of advance of the containers C left behind by the container sweep assembly 22 such that a gap or clearance between the container shift assembly 120 and the leading edge of the advancing stream of containers is sufficient for the vacuum fitting plate 138 and the associated fittings 140 and containers C supported on the fittings can pivot from the down position to the horizontal, up position. It should be noted that during the advance of the container sweep assembly 22 transferring the first pattern into the main hoist that the container shift assembly 120 cross bar 134 remains in the retracted position.

Next, as illustrated in FIGS. 16 and 17, the container sweep assembly 22 moves into the raised position such that the distal ends 92 of the plungers 90 in the forward plunger assembly 84 and the rearward plunger assembly 86 retract from the containers to a position above a plane defined by the uppermost extent of the containers. The container shift assembly 120 remains in the retracted position and the vacuum fitting assembly remains pivoted in the up position. Also, the containers constituting the second pattern move into the sweep area and engage the pattern formers 28 at the forward edge of the sweep area.

Next, as shown in FIGS. 18 and 19, the container sweep assembly 22 remains in the raised position and moves upstream relative to the containers to the retreated position. Again, the container shift assembly 120 remains retracted and the vacuum fitting plate 138 remains pivoted up. In the retreated position, the plungers 90 in the forward and rearward plunger assemblies 84, 86 register over the containers in the front row and the last row of the second pattern.

As best shown in FIG. 4, the 9 containers removed from the stream of containers by the container shift assembly 120 remain on the vacuum fittings 140 in a position pivoted upwardly above the stream of containers. The 10th container, which is left behind by the container shift assembly 120, contacts the pattern former 28 first, i.e., leads the advancing stream of containers to the pattern former and reaches its position in the second row of the first pattern. Subsequently, the remainder of the containers C slide by this container that was left behind by the container shift assembly 120 so that the second pattern forms behind the pattern stops 28.

Next, as best shown in FIGS. 20 and 21, the container sweep assembly 22 moves into the lower position and the plungers 90 in the forward and rearward plunger assemblies 84, 86 move into a housed relation to the containers C in the front row and last row of the second pattern. The container shift assembly 120 remains retracted and the vacuum fitting assembly 132 remains pivoted up so that movement of the container sweep assembly 22 into the lower position and registration of the plungers 90 in the containers is not prevented by any interference of the container shift assembly 120 with the containers on the container support surface 16.

Subsequently, as best shown in FIGS. 22–23, the container sweep assembly 22 advances the second pattern, thereby creating a clearance between the last row of the second pattern and the leading edge of the advancing containers. When the gap between the last row of the second pattern and the leading edge of the advancing containers is sufficiently great, the container shift assembly 120 operates to pivot the vacuum fitting assembly 132 from the up position to the down position, i.e., so that the 9 containers supported by the vacuum fittings 140 move into a vertical position closely spaced to the container support surface 16. During this pivoting movement of the vacuum fitting assembly 132, the cross bar 134 on the container shift assembly 120 moves along the shifter slide rails 124 toward the extended position at such a rate that when the container sweep assembly 22 reaches the fully advanced position as shown in FIG. 23, the containers on the vacuum fitting assemblies 140 are precisely placed in the pattern stop 28 in the positions to be occupied by the first row of the third pattern of containers. As shown in FIG. 22, this placement occurs immediately behind the pattern stops 28 and before the advancing stream of containers arrives at the pattern stops 28. The vacuum fittings 140 then release the containers in position at the pattern stop 28. Thus, the 9 cans removed from the stream of containers by the container shifting apparatus are reinserted in position to become the first row of containers in the third pattern.

Subsequently, and as shown in FIGS. 24 and 25, the container sweep assembly 22 moves into the raised position, the container sweep assembly 22 moves upstream to the retreated position, the container shift assembly 120 moves to the retracted position and the vacuum fittings 140 remain in the pivoted down position.

The container sweep assembly 22 is thus poised to move back into the initialized position and to sweep the third pattern into the main hoist.

Various features of the invention are set forth in the following claims.

What is claimed is:

1. A palletizer comprising:
  a conveyor assembly for conducting a plurality of containers,
  a pattern former for arranging the containers into a voidless pattern, and
  a container sweep assembly for repeatedly segregating the containers into a series of predetermined patterns and for transferring the patterns onto a pallet, the container sweep assembly including a frame movable between one and another positions relative to said pattern former, a forward plunger assembly supported by the frame and defining a first row of containers in the pattern, a rearward plunger assembly supported by the frame and defining a last row of containers in the pattern, said forward and said rearward plunger assemblies being movable with said frame between said one and another positions, and a vacuum fitting assembly attached to the frame of the container sweep assembly, said vacuum fitting assembly being adapted to engage a row of containers not positioned within the pattern of containers for movement relative to the frame of the sweep assembly between a retracted position adjacent the rearward plunger assembly and an extended position spaced away from the rearward plunger assembly.

2. A method of forming a series of predetermined patterns of cylindrical articles, said method comprising the steps of:
  providing a stream of containers,
  providing a sweep assembly controllably movable relative to said stream of containers between one and another positions,
  arranging the stream of containers into a voidless pattern having alternating rows defined respectively by including n containers and n–1 containers,
  segregating a first pattern of containers having a first row including n–1 containers and a last row of n–1 containers using said sweep assembly that removes the first pattern of containers from the stream of containers and places the first pattern onto a pallet,
  removing n–1 containers from the next row of containers not part of the first pattern,
  segregating a second pattern of containers having a first row including n–1 containers and a last row of n–1 containers using the sweep assembly to remove the second pattern of containers from the stream of containers and place the second pattern onto the pallet, and segregating a third pattern of containers, including the step of placing the temporarily removed containers into a row of n–1 containers in the third pattern using said sweep assembly to remove the third pattern of containers from the stream of containers and place the third pattern onto the pallet.

3. A method of forming a series of predetermined patterns of cylindrical articles as claimed in claim 2 wherein the n–1 containers are removed from a row of n containers in the step of removing n–1 containers.

4. A palletizer assembly comprising a sweep assembly including a frame having a pair of generally parallel side members and a cross member extending between the side members, the side members having upstream ends and downstream ends and the sweep assembly also including a pair of forward stanchions that extend vertically upward from the downstream ends of the respective side members, and a pair of rearward stanchions extending vertically upward from the upstream ends of the side members, a pair of generally vertically extending slides, each of the slides having a lower end connected to a side member and an upper end, a forward plunger assembly extending across between the side members, a rearward plunger assembly extending between the side members, each of said plunger assemblies including a plunger support slidably supported by a respective slide between a lowered position and a raised position, each plunger assembly including a plurality of fingers which are fixed to, and extend downwardly from, the respective plunger support, and a container shift assembly supported by the frame and including a pair of shifter slide rails extending rearwardly of the rearward plunger support, the shifter slide rails having upstream ends and downstream ends, the upstream ends of the shifter slide rails being offset from the downstream ends of the slider rails.

5. A method of forming a series of predetermined patterns of cylindrical articles as claimed in claim 2 wherein the row of n–1 containers is placed into a first row in the third pattern in the step of placing the temporarily removed containers into a row of n–1 containers in the third pattern.

6. A method of forming a series of predetermined patterns of cylindrical articles as claimed in claim 2, wherein the step of providing a stream of containers is done using a conveyor.

7. A method of forming a series of predetermined patterns of cylindrical articles as claimed in claim 2 wherein the step of arranging the stream of containers into a voidless pattern having alternating rows including n containers and n–1 containers is done using pattern stops that are arranged to correspond with a staggered lead edge of the containers.

8. A method of forming a series of predetermined patterns of cylindrical articles as claimed in claim 2 wherein said step of segregating a first pattern of containers is done using a sweep assembly.

9. A method of forming a series of predetermined patterns of cylindrical articles as claimed in claim 8 wherein said step of segregating a second pattern of containers is done using the sweep assembly.

10. A method of forming a series of predetermined patterns of cylindrical articles as claimed in claim 9 wherein said step of segregating a third pattern of containers is done using the sweep assembly.

11. A method of forming a series of predetermined patterns of cylindrical articles as claimed in claim 2 wherein of removing n–1 containers from the first pattern is done using a container shift assembly.

12. A method of forming a series of predetermined patterns of cylindrical articles as claimed in claim 2 wherein said step of placing the removed containers into a row of n–1 containers in the third pattern further includes the step of offsetting the temporarily removed containers by a distance equal to one-half a container diameter.

13. A method of forming a series of predetermined patterns of cylindrical articles as claimed in claim 12 wherein the step of placing the temporarily removed containers into a row of n–1 containers in the third pattern is done using a container shift assembly.

14. A palletizer assembly as claimed in claim 4 further comprising a conveyor assembly for conveying articles onto a pallet, the conveyor assembly extending intermediate the pair of generally parallel side members.

15. The palletizer assembly as claimed in claim 14 wherein the conveyor assembly includes a container support surface and further comprising a plurality of selectively retractable pattern stops which extend upwardly through the container support surface.

16. The palletizer assembly as claimed in claim 4 wherein the plungers in one of the forward plunger assembly and the rearward plunger assembly is arranged in a staggered pattern extending along the respective plunger supports.

17. The palletizer assembly as claimed in claim 4 wherein each of the plurality of fingers on the forward plunger assembly and the rearward plunger assembly include a distal end having a diameter that is appropriately sized to be received by the interior of a container.

18. The palletizer assembly as claimed in claim 4 wherein the rearward plunger assembly and the forward plunger assembly each include means for selectively and repeatedly moving the plunger support between a lowered position and a raised position.

19. The palletizer assembly of claim 18 wherein the means for selectively and repeatedly moving the plunger support includes a pair of rearward plunger assembly lift actuators positioned on the rearward stanchions and a pair of forward plunger assembly lift actuators positioned on the forward stanchions.

20. The palletizer assembly of claim 4 wherein the upstream ends and the downstream ends of the shifter slide rails are offset a distance that is equal to one half a diameter of the containers.

21. The palletizer assembly as claimed in claim 4 wherein the shifter slide rails each include a track extending between the upstream ends and the downstream ends of the shifter slide rails.

22. The palletizer assembly of claim 4 wherein the downstream ends of the shifter slide rails are attached to the rearward plunger support.

23. The palletizer assembly as claimed in claim 4 wherein the container shift assembly further includes a vacuum fitting assembly supported by the shifter slide rails.

24. The palletizer assembly as claimed in claim 23 wherein the vacuum fitting assembly includes a cross bar having opposite ends supported by each of the shifter slide rails.

25. The palletizer assembly as claimed in claim 23 wherein the vacuum fitting assembly includes a plurality of finger-like vacuum fittings that are adapted to extend into a row of containers.

* * * * *